US009026100B2

(12) United States Patent
Castro Castro et al.

(10) Patent No.: US 9,026,100 B2
(45) Date of Patent: May 5, 2015

(54) POLICY AND CHARGING CONTROL METHOD, NETWORK ENTITIES, COMMUNICATION SYSTEM AND COMPUTER PROGRAM THEREFOR

(75) Inventors: Fabian Castro Castro, Madrid (ES); Ana Maria Lopez Nieto, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 398 days.

(21) Appl. No.: 13/319,584

(22) PCT Filed: May 29, 2009

(86) PCT No.: PCT/EP2009/056631
§ 371 (c)(1),
(2), (4) Date: Nov. 9, 2011

(87) PCT Pub. No.: WO2010/136070
PCT Pub. Date: Dec. 2, 2010

(65) Prior Publication Data
US 2012/0064878 A1 Mar. 15, 2012

(51) Int. Cl.
*H04W 24/02* (2009.01)
*H04L 12/14* (2006.01)
(Continued)

(52) U.S. Cl.
CPC ............ *H04L 12/14* (2013.01); *H04L 12/1457* (2013.01); *H04M 15/00* (2013.01); *H04M 15/66* (2013.01); *H04W 4/24* (2013.01)

(58) Field of Classification Search
USPC ............................ 455/418; 705/400; 370/252
See application file for complete search history.

(56) References Cited

U.S. PATENT DOCUMENTS

2009/0254494 A1* 10/2009 Li et al. ........................ 705/400

2010/0150003 A1* 6/2010 Andreasen et al. ........... 370/252
2011/0270722 A1* 11/2011 Cai et al. ........................ 705/34

FOREIGN PATENT DOCUMENTS

| EP | 2 091 178 | 8/2009 |
| WO | WO 2008/094401 | 8/2008 |
| WO | WO 2009/012686 | 1/2009 |

OTHER PUBLICATIONS

International Search Report for PCT/EP2009/056631, mailed Oct. 13, 2009.

(Continued)

*Primary Examiner* — Mahendra Patel
*Assistant Examiner* — Natasha Cosme
(74) *Attorney, Agent, or Firm* — Nixon & Vanderhye, P.C.

(57) ABSTRACT

It is provided a policy and charging control method carried out in a communication network. The communication network comprises a first network entity (100), PCFR, including a policy and charging rules function and a second network entity (200), PCEF, including a policy and charging enforcement function for enforcing policy and charging rules in at least two groups of cells, each group of cells including at least one cell. The method comprises configuring (S110), on the second network entity, for a first one group of the at least two groups of cells, an event subscription dependent on a location of the user equipment, the event subscription being specific to the first group of cells. The method further foresees, at the second network entity, detecting (S120) an event associated with the configured event subscription and sending a notification of the detected event to the first network entity and, at the first network entity, after receipt of the notification, determining (S130) whether to perform one among installing, modifying and removing a policy and charging control rule in dependence of the detected event. Corresponding network entities, network system and computer programs are provided.

20 Claims, 8 Drawing Sheets

(51) Int. Cl.
*H04M 15/00* (2006.01)
*H04W 4/24* (2009.01)

(56) References Cited

OTHER PUBLICATIONS

Written Opinion of the International Searching Authority for PCT/EP2009/056631, mailed Oct. 13, 2009.

International Preliminary Report on Patentability for PCT/EP2009/056631, dated Oct. 12, 2010.

3GPP TS 23.203, $3^{rd}$ Generation Partnership Project; Technical Specification Group Services and System Aspects; Policy and Charging Control Architecture (Release 8); V8.1.1 (Mar. 2008).

3GPP TS 29.212 v8.3.0, 3rd Generation Partnership Project; Technical Specification Group Core Network and Terminals; Policy and Charging Control over Gx reference point (Release 8) Mar. 2009 (80 pages).

* cited by examiner

POLICY AND CHARGING CONTROL METHOD, NETWORK ENTITIES, COMMUNICATION SYSTEM AND COMPUTER PROGRAM THEREFOR

This application is the U.S. national phase of International Application No. PCT/EP2009/056631, filed 29 May 2009, which designated the U.S., the entire content of which is hereby incorporated by reference.

TECHNICAL FIELD

The present invention relates to a policy and charging control method carried out in a communication network. The invention also relates to a network entity configured to perform a policy and charging rule function in a communication network, to a network entity configured to perform a policy and charging enforcement function for enforcing policy and charging rules in a communication network, to a communication system for performing policy and charging in a communication network and to a computer program for performing a policy and charging rules function in accordance with a location of a user equipment in a communication network.

BACKGROUND OF THE INVENTION

In communication networks, such as telecommunication networks, a call or a service often involves, on the one hand, a control plane or signalling plane and, on the other hand, a user plane. The control plane or signalling plane is in charge of establishing and managing a connection between two points on the network. The user plane or media plane is in charge of transporting the user data.

In this context, network operators often want to define and enforce a set of rules in the network. A set of rules constitutes policies. A policy framework for managing and enforcing these policies usually includes at least three elements, or functions: a policy repository for storing the policy rules which may be user-specific, a policy decision element, function or point, and a policy enforcement element, function or point. The purposes of a policy framework include controlling subscriber access to the networks and services.

A policy framework notably addresses the decisions as to whether the subscriber is entitled, or authorized, to enjoy a service, a QoS, and whether the network can provide the service to the subscriber.

Policy and charging control architectures, such as, but not limited to, the architecture described in 3GPP TS 23.203 v8.1.1 (2008-03), Technical Specification Group Services and System Aspects, Policy and charging control architecture (Release 8) (available on http://www.3gpp.org/ftp/Specs/2008-03/Rel-8/23_series/), integrate the policy and charging control. The policy and charging control (PCC) architecture permits to integrate both policy and charging control thus optimizing the information flow, however it suffers from several disadvantages as later explained.

Moreover, mobile operators are interested in being able to perform policy decisions and to enforce policies based on location of user equipments. Prior art techniques like the one above cited suffer from several disadvantages like lack of simplicity of implementation or lack of flexibility. Furthermore, prior art techniques are known for requiring a large amount of signalling, thus increasing the load of the network, especially when the location of user equipments needs to be monitored. Prior art solutions are furthermore difficult to configure, to maintain and to adapt to the need of operators.

It is desirable to provide methods, network entities, systems and computer programs to improve policy and charging control architectures and implementations, notably by allowing more flexibility without increasing the implementation and architecture complexity also in those situations wherein the policy and charging is performed depending on the location of a user.

SUMMARY OF THE INVENTION

An object of the invention is to provide improvements over the known techniques relating to policy and charging control methods.

The object is achieved by the subject-matter of the independent claims. Advantageous embodiments are defined in the dependent claims. Further examples are provided for facilitating the understanding of the invention.

According to a first embodiment of the present invention, it is provided a policy and charging control method carried out in a communication network. Such communication network comprises a first network entity including a policy and charging rules function and a second network entity including a policy and charging enforcement function for enforcing policy and charging rules in at least two groups of cells, each group of cells including at least one cell. This method comprises configuring, on the second network entity, for a first one group of the two groups of cells, an event subscription dependent on a location of the user equipment wherein the event subscription is specific to the first group of cells. The method then foresees a step of detecting, at the second network entity, an event associated with the configured event subscription and sending a notification of the detected event to the first network entity. Then, the method according to the first embodiment foresees, at the first network entity after receipt of the notification, a step of determining whether to perform an operation among installing, modifying and removing a policy and charging control rule in dependence of the detected event. Thus, the step of determining implies that it is determined whether to install, modify or remove a policy and charging control rule in dependence of the detected event.

In other words, the method according to this embodiment allows the configuration of an event subscription which depends on a location of the user equipment and which is specific to a first group of cells. In this way, it is possible to configure the event subscription according to circumstances and needs corresponding to the group of cells. Since the group of cells may be made to correspond to an area that can be occupied by user equipments, the event subscription can be tailored or adapted to that area. This results in a configuration of the event subscription which is flexible and easy to adapt to several circumstances, i.e. to different areas covered by different group of cells.

Accordingly, the second network entity detects an event associated with the configured event subscription and notifies the first network entity. As a consequence, the first network entity, upon receipt of the notification, is capable of determining whether to install, modify or remove a policy and charging control rule in dependence of the detected event.

As a consequence, the method has the capability of deciding which rules to apply to a given user equipment depending on the user equipment location and an area in which the user equipment possibly is, by using event subscriptions specific for a group of cells corresponding to a given area.

Therefore, the method is capable of providing location information configured and adapted for a given area corresponding to the group of cells thus enabling a flexible configuration of the event subscription related to the location of a given user.

An advantage of such an implementation consists in that a large amount of signalling is not required. In fact, the signalling is only the one required according to the type of events that need to be monitored for a specific area represented by the group of cells. In one illustrative example, when it is decided that no location information associated to a user equipment are needed for a given group of cells, then the event subscription can be configured such that no events related to the location of that user need to be monitored and notified, thus leading to a reduction in the signalling and consequently network resources. In another illustrative example, when it is decided that a group of cells comprises a large number of cells and only movements relating to leaving or entering the group should be monitored and notified, then the event configuration can be configured to ignore those events related to the movement of a user equipment among different cells belonging to the same group. Only events related to the user equipment leaving or entering the group are notified, thus leading to a considerable reduction of network resources used for signalling purposes.

Moreover, by configuring the event subscription it is possible to specify the level of granularity of events dependent on the location of the user equipment that need to be detected. Thus, a resulting advantage consists in a flexible implementation while requiring reduced signalling and network resources. Further advantages are apparent to the skilled person and from the following description of further embodiments of the invention.

It is noted that, according to the present invention, a policy and charging control method is a method through which a network operator manages the rules to be applied to the users' sessions, or subscribers' sessions, regarding which use of the networks is allowed and which QoS and rating must be applied to a particular session on the user plane.

Furthermore, a policy and charging rules function (PCRF) element is a policy decision element which, notably based on the user profile and on the network conditions, decides which rules have to be enforced in the user plane with respect to a particular session. In a General Packet Radio Service (GPRS) network for instance, the PCRF may be capable of communicating with the Gateway GPRS Support Node (GGSN) to transfer authorization information, so as to be able to control Internet Protocol (IP) bearer resources. The IP bearer enables the user plane transport of IP packets and is capable of carrying many IP flows.

Further, a policy and charging enforcement function (PCEF) element is in charge of enforcing the PCC rules decided by the PCRF, The POSE enforces the PCC rules in the user plane with respect to a particular session. An element according to the present invention, also referred to as network entity, may be implemented through or within a device like a network node or may be alternatively implemented by suitably distributing the necessary functions among multiple devices like multiple network devices.

According to a modification of the first embodiment, the method may comprise the event subscription further depending on at least one among a user profile associated to a user using the user equipment and policy criteria associated to the user.

According to a further embodiment of the invention, the event subscription may be configured on the basis of configuration information received at the second network entity from at least one among the first network entity and a further network entity. In other words, another network entity like for instance a network node or a network manager device may send configuration information to the second network entity which, on the basis of this configuration information, configures the event subscription.

According to another aspect, the present invention provides a first network entity configured to perform a policy and charging rules function in a communication network. This network entity comprises a controller for determining event subscription information on the basis of a location of a user equipment wherein the event subscription information are specific to a first group of cells and wherein the first group of cells is comprised in at least two groups of cells, each group of cells including at least one cell. The network entity then comprises a transmitter for sending the event subscription information to a second network entity and a receiver for receiving from the second network entity a notification corresponding to an event detected according to the event subscription information. The controller including this network device is further adapted to further determine, upon receipt of the notification, whether to instruct the second network entity to perform an operation among installing, modifying and removing a policy and charging control rule in dependence of the detected event.

The network entity according to the present embodiment is therefore capable of determining event subscription information specific to an area corresponding to a group of cells and, on the basis of notification corresponding to events detected according to the event subscription information, is adapted to determine whether to instruct a second network entity to install, modify or remove a policy and charging control rule depending on the detected event. In other words, the network entity depending on the area represented by the group of cells configures event subscription information according for instance to a level of granularity needed for that area. Thus, the network entity is capable of flexibly determining the event configuration required for a given area corresponding to the group of cells consequently leading to an efficient use of signalling and corresponding network resources. Furthermore, depending on the detected event, the network entity may instruct (if it decides accordingly) a second network entity to install, modify or remove a policy and charging control rules by using the event subscription information which have been tailored or adapted to a given area represented by the group of cells. Therefore, the network entity is capable of performing policy and charging rules function based on the location of a user while maintaining the needed signalling at minimum.

According to another aspect of the present invention, it is provided a second network entity configured to perform a policy and charging enforcement function for enforcing policy and charging rules in at least two groups of cells in a communication network wherein each group of cells includes at least one cell. This network entity comprises a controller for configuring, for a first one for the at least two groups of cells, at least an event subscription dependent on a location of a user equipment wherein the event subscription is specific to the first group of cells. This network entity further comprises a detector for detecting an event associated with the configured event subscription and a receiver adapted to receive instructions from a first network entity to install, modify or remove policy and charging rules depending on the detected event.

According to this embodiment, a network entity is provided which is capable of detecting events associated to an event subscription specific to an area corresponding to a given group of cells. In other words, this network entity is capable of detecting events dependent on the location of a user equipment; however, only those events are reported that correspond to an event subscription associated to an area corresponding to the first group of cells. In other words, this network entity can be configured to detect and/or notify only events corresponding to an event subscription associated to a given area corresponding to the group of cells. Thus, such network entity will not detect and/or notify all kind of events associated to a user but only those corresponding to the event subscription. In one illustrative implementation, this network entity is capable of detecting and receiving all types of events related to the location of a user equipment but adapted to filter or select only those events which correspond to the event subscription.

The advantage of this network entity consists, therefore, in that the usage of network resources for signalling can be adapted according to needs thus avoiding waste of network resources.

According to a further aspect of the present invention, it is provided a communication system for performing policy and charging in a communication network, wherein the system includes a first network entity and a second network entity. The first network entity according to the system of the present embodiment comprises a first controller for determining event subscription information on the basis of a location of a user equipment wherein the event subscription information are specific to a first group of cells and the first group of cells are comprised in at least two group of cells, each group of cells including at least one cell. The second network entity of the system according to this embodiment comprises a second controller for configuring, for a first one of the at least two groups of cells, event subscription dependent on the location of a user equipment wherein the event subscription is specific to the first group of cells. The event subscription is configured on the basis of the event subscription information determined by the first network entity. The second network entity of the system according to this embodiment then comprises a detector for detecting an event associated with the configured event subscription and for sending to the first network entity a notification corresponding to an event detected according to the event subscription information. Furthermore, the first controller of the first network entity comprised in the communication system is further adapted to further determine, upon receipt of the notification, whether to instruct the second network entity to install, modify or remove a policy and charging control rule depending on the detected event.

The system according to this embodiment of the invention achieves similar or corresponding advantages as achieved by the method and network entities of the present invention, namely, allowing detection of events in a flexible way by allowing the definition of the event subscription according for instance to the level of granularity needed for a given area associated by a group of cells. Moreover, the system allows for an efficient use of network resources since it involves only the signalling related to the events corresponding to the configured event subscription and not to all kind of events that can be detected in a communication network.

According to a further aspect of the present invention, it is provided a computer program for performing a policy and charging rules function in accordance with a location of a user equipment in a communication network wherein the computer program comprises instructions which are configured, when executed on a programmable system, to cause the programmable system to carry out the method steps according to the different embodiments of the present invention. The programmable system may be a distributed programmable system but is not restricted to such a case.

The present invention obviates at least some of the disadvantages of the prior art, as for instance explained above or in the remaining part of the specification, and provides an improved method, network entities, communication system and computer program for performing a policy and charging rules function.

DETAILED DESCRIPTION

In the following, preferred embodiments of the invention will be described with reference to the figures. It is noted that the following description contains examples that serve to better understand the claimed concepts, but should not be construed as limiting the claimed invention.

Figure 1:
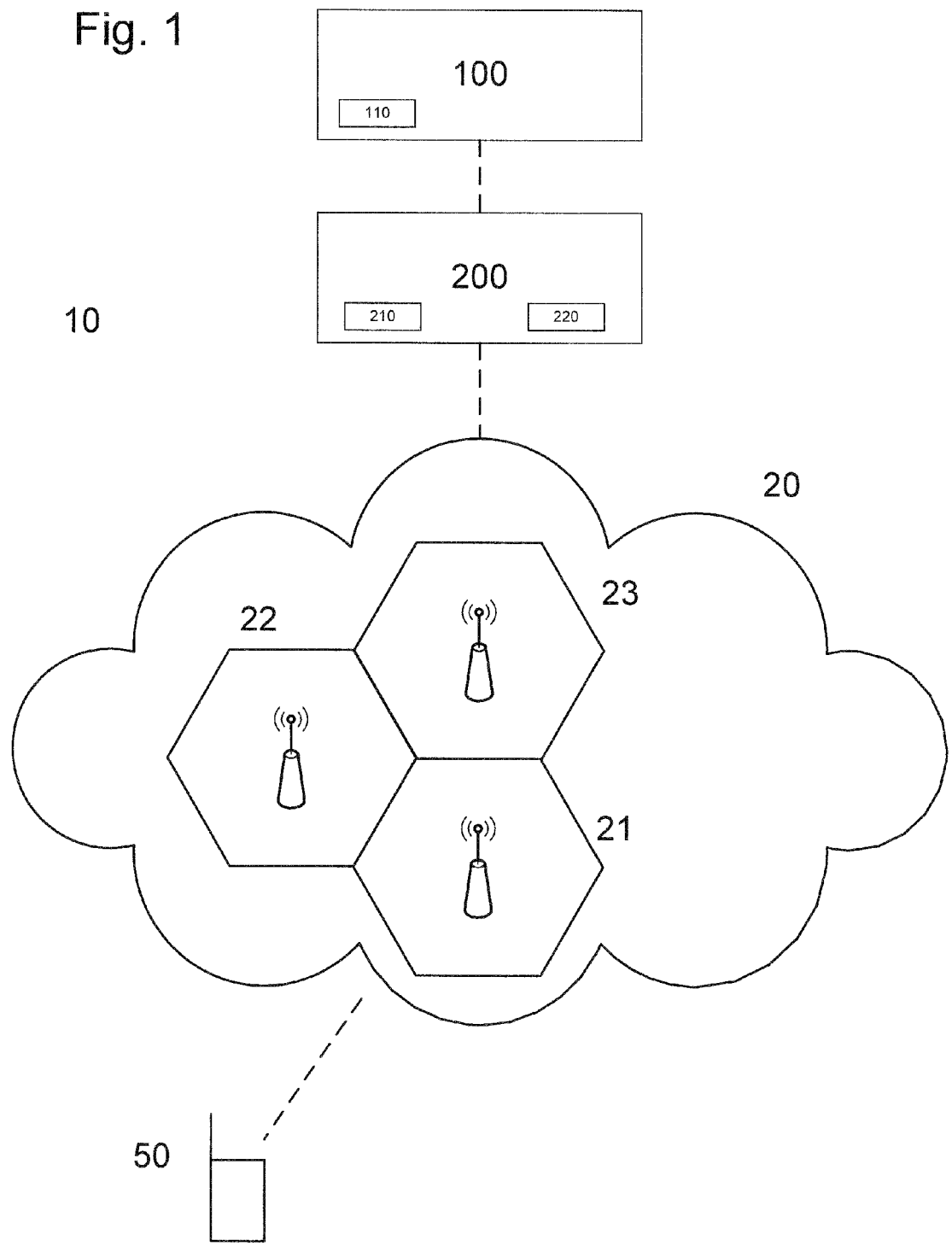
FIG. 1 is a block functional diagram of a communication network according to an embodiment of the present invention.

FIG. 1 shows an example of a communication network to which the present invention can be applied. Such a communication network comprises several cells 21, 22, 23 each capable of establishing communication with one or more user equipments as the one referenced with 50. The communication network should comprise at least one cell. In fact, the invention would function also in the presence of only one cell. One cell typically comprises a base station which exchanges communication with at least one user equipment 50. A user equipment is a mobile station typically carried by a user and enables the user to establish voice or data communication through the base station comprised in a given cell. The communication network according to the present invention can be arranged such that one or more cells are grouped together to form a group of cells. A group of cells could be constituted for example by the cell 21 while a second group of cells could be constituted by cell 22. However, a group of cells may comprise more than one cell, for instance cells 21 and 22 while the second group of cells may also comprise more than one cell, for instance cell 23 and another cell not depicted in FIG. 1. It shall also be noted that, depending on circumstances, two groups of cells may share also one, more or all the cells comprised in each group. For instance, a first group of cells may comprise cells 21 and 22 while a second group of cells may comprise cells 22 and 23. By defining a group of cells, a given area covered by the cells belonging to this group can also be determined. A user equipment exchanging communication with one of the cells belonging to the group of cells can therefore be determined as being present in an area corresponding to the group of cells comprising the cell with which the user equipment is exchanging communication at a given moment in time. For instance, when a group of cells comprises only the cell 21, which is carrying out communication with the user equipment 50, then it can be determined that the user equipment 50 has a position in an area corresponding to the cell covered by cell 21. In the case where a group of cells comprises more than one cell, for instance cells 21 and 22, and when the user equipment 50 is carrying out communication with one of the cells 21 or 22, then it can be assumed that the user equipment 50 is at a position corresponding to an area associated with the area covered by the cells 21 and 22. In other words, by grouping the cells according to circumstances, it is possible to put predetermined areas in correspondence with the cells making up the group. At the same time, given a group of cells, it is possible to determine the corresponding area. As an example, in a case wherein the cell 21 covers a predetermined building like for instance an office building and a user equipment 50 is carrying out communication with this cell, then it can be assumed that the user equipment finds itself in the predetermined office building.

In the above, reference has been made to a cell served by a base station, wherein the cell corresponds or is associated to an area covered or served by a base station. In those cases wherein a base station or equivalent structure is capable of selectively serving an area surrounding it by means of several antennas, then each of said area selectively served by a part of the base station constitutes a cell within the meaning of the present invention. In other words, any cell is adapted to be used for the present invention as long as it can be associated or put into correspondence with a predetermined area. It is understood that the correspondence between an area and the cell can be only approximated.

Reference 10 represents a network configured to perform a policy and charging rules function. Such network, notably based on the user profile and/or on the network conditions, is configured to decide which rule has to be enforced in the user plane with respect to a particular session. For instance, by making reference to a non limiting example of a general packet radio service (GPRS) network, the PCRF may be capable of communicating with the gateway GPRS support node (GGSN) to transfer authorization information so as to be able to control internet protocol (IP) resources. The IP bearer enables the user plane transport of IP packets and is capable of carrying many IP flows.

A network entity like the one referenced with 100 or 200 in FIG. 1 can be embodied in a network device like a network node or a server or can be distributed over several devices like several network nodes. In the case of the network entity 200, this could be implemented for instance in a GGSN node in case the communication network is a GPRS network. When the communication network is a WLAN network, the network entity 200 could instead be a PDG node. The same network entity may be also applied to other networks like for instance UMTS, CDMA based, LTE, . . . . Further, the network entity could be embodied in a generic network node or gateway or server or otherwise distributed among different network devices.

In the case where the network is a GPRS network, one group of cells could be served under the same SGSN node. However, the invention is not restricted to this case. In fact, the invention would also work in case the cells belonging to the same group of cells would be served by different SGSNs. In fact, as already mentioned above, a group of cells should be intended as delimiting or corresponding to an area wherein user equipments can move and are independent of the other network nodes to which each cell is eventually connected to.

The above observations are valid also for other types of network, as e.g GSM, UMTS and evolutions thereof, networks based on CDMA or evolutions thereof, LTE, . . . , to which the invention can be applied as the skilled person would readily recognize. The user equipment 50 can be any type of device, also non portable, capable of establishing communication within a given cell, wherein the communication can be of any kind like voice and/or data.

Figure 2:
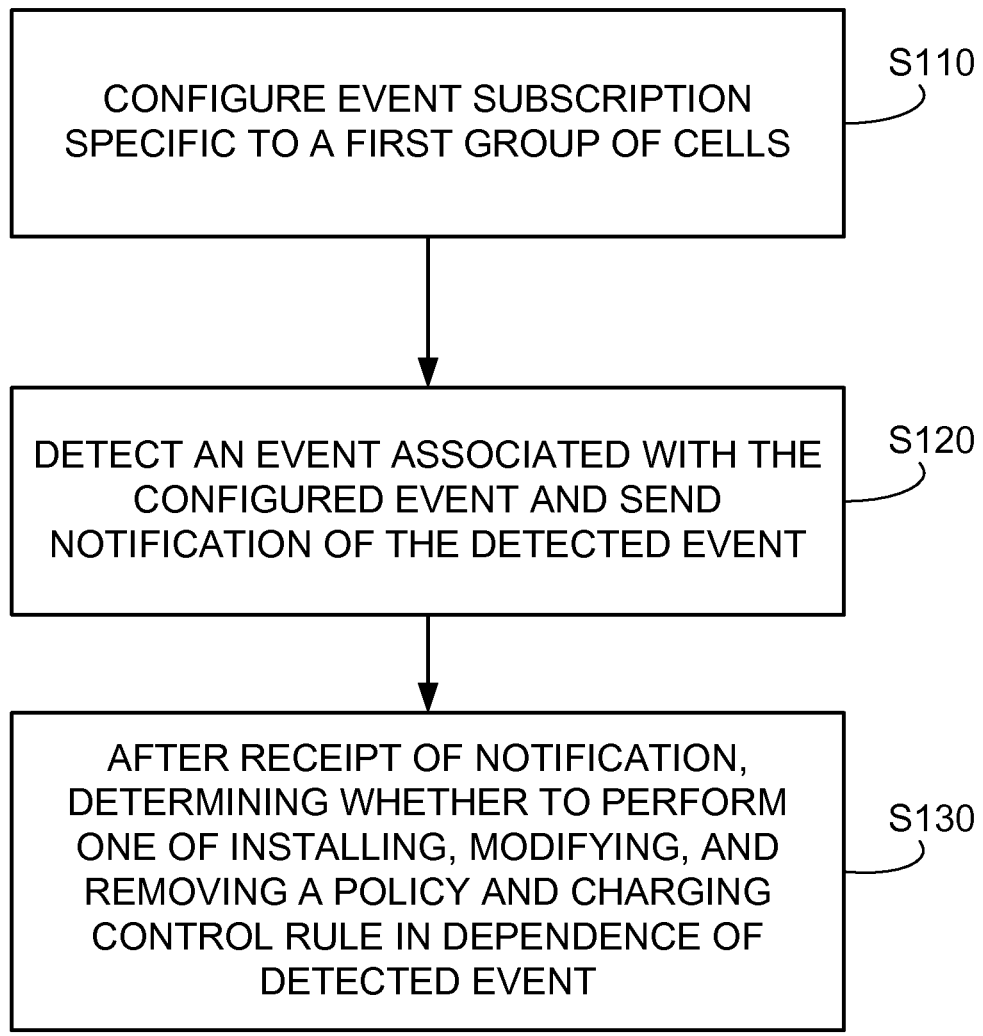
FIG. 2 is a flow chart showing the steps according to a method of an embodiment of the present invention.

Reference will now be made to FIG. 2 showing a schematic flow chart of a policy and charging control method embodying the present invention. The policy and charging control method according to the present embodiment may be carried out in a communication network as depicted in the illustrative example of FIG. 1. Such a communication network comprises a first network entity 100 including a policy and charging rules function (PCRF) and a second network entity 200 including a policy and charging enforcement function (PCEF) for enforcing policy and charging rules in at least two groups of cells wherein each group of cells includes at least one cell. In view of the considerations made above, this implies that the cells of a communication network may be arranged in one or more groups, each group comprising at least one cell and wherein different groups may share one, more or all the cells, and wherein each groups of cells is associated or corresponds to an area within which a user equipment establishes communication with a serving cell. The first network entity PCRF 100 is the network entity in charge of deciding which rules have to be enforced against a given user/user equipment with respect to a particular session. The second network entity PCEF 200 is instead responsible for enforcing the actual rules which are decided by the first network entity 100. The policy and charging rules may depend on several factors including the location of the user equipment/user. When the enforcement of said rules and/or the decision as to which rules to apply is dependent on the position of the user or user equipment, the monitoring or detection of the current position or location of a user equipment is needed. In order to efficiently and flexibly carry out the policy and charging control method by taking into account the location of the user equipment, the method according to the present embodiment foresees a step of configuring S110 performed on the second network entity 200. The step of configuring S110 consists in configuring for a first group of cells an event subscription dependent on a location of the user equipment 50. The first group of cells is typically a group of cells selected from among at least two groups of cells, wherein each of these groups comprises at least one cell. However, the invention would also be applicable to a network comprising only one group of cells and also to the case wherein the only group of cells comprises only one cell. The event subscription mentioned is specific to the first group of cells.

It is noted that the step of configuring S110 can be performed in one example at the first network entity. However, the invention is not limited to such a case since other possibilities are foreseen.

For instance, the step of configuring an event subscription can be performed, according to other examples, at a network management node separate and distinct from the first network entity and from this network management node transferred to the second network entity when necessary, e.g. upon initialization or maintenance or during session establishment. The step of configuring the event subscription may then be implemented in one example by selecting, based on the location information of a user equipment, a set of events which are then included in the subscription. With this respect, a subscription typically comprises predetermined conditions and messages associated to these conditions. When one of these conditions is detected, then the corresponding message is issued. In other words, the subscription dependent on a location of the user equipment is an indication of certain conditions dependent on the location of a user equipment in which the first network entity has interest in being notified. Upon occurrence of said conditions, an event notification is generated and correspondingly reported to the first network entity. The step of configuring is performed for a first group of cells. The first group of cells can be the one where the user equipment is currently located. Accordingly, the event subscription is configured for this group of cells wherein the user equipment is located. However, in other embodiments, the first group of cells can be any predetermined group of cells for which a subscription is once determined, e.g. through network management at initialization or during maintenance, and later associated to a user when the user is present in that cell. In this case and according to an example, the step of configuring may be performed upon a user entering or finding itself in the first group of cells. In other embodiments, an event subscription can be associated with a first group of cells and later associated with a user when the user enters that cell or group of cells. One aspect of the present invention consists in that the subscription can vary from group of cells to group of cells or in other words from area to area since each area is in correspondence with a group of cells. The configuring of the event subscription can then be done when a user is located in that cell or enters that cell or group of cells, in other words in real time. According to other embodiments, the configuring can be performed beforehand, e.g. at initialization or configuration of the network, and later associated to the user when the user enters that group of cells or the area corresponding to that group of cells.

The event subscription is dependent on a location of a user equipment. The location of a user equipment indicates the current location or position thereof. Also the detection of "no location" is a valid option for the location of the user equipment, for instance when the mobile station or user equipment is off. The fact that the event subscription is dependent on a location of a user equipment implies that the events are generating corresponding to the current position of the user equipment. In one example, the movement of a user equipment may trigger some events matching the event subscription, thus causing notification of corresponding messages.

The method according to the present embodiment then comprises a step of detecting S120 at the second network entity 200, an event associated with the configured event subscription and sending a notification of the detected event to the first network entity. In other words, an event for instance dependent on the location or movement of a user equipment is detected wherein such detected event is one associated with the event subscription previously configured according to step S110. Upon said detection, a notification occurs of the detected event to the first network entity 100.

The method according to the present embodiment then comprises a step of determining S130, at the first network entity after receipt of the notification, whether to install, modify or remove a policy and charging control rule in dependence of the detected event. One result of the step of determining can be to make no further operations, thus leaving the policy and charging control rule unchanged from the previous state. Other possible results of the step of determining consists instead in deciding to install a policy and charging control rule when for instance the detected event, dependent on a location of the user equipment, requests for an installation of a policy and charging control rule. For instance, when a user equipment changes state from off to on, a location of the user equipment is detected, as triggered by the turning on of the user equipment, and a corresponding notification is issued to the first network entity which decides to install a policy and charging control rule depending on the current position of the user equipment. Besides, depending on the current location of the user equipment, the second network entity can be configured with an event subscription specific to the group of cells wherein the user equipment is currently located.

According to other circumstances, the step of determining S130 may result in modifying a policy and charging control rules in dependence of the detected event. For instance, upon change of the user equipment from one group of cells to another group of cells, the first network entity may decide to modify part of or the entire of the policy and charging control rules previously in place for the user equipment. In some cases, e.g. when a replacement of the previously existing policy and charging control rule is to be performed, the operation of modifying the policy and charging control rule may foresee the removal of the previous existing policy and charging control rule and the installation of new policy and charging control rule. However, modifying the policy and charging control rule could also be directed to only a part of the existing policy and charging control rules and not to their entirety, therefore requiring a modification of only part thereof.

Another possible result of the step of determining S130 consists in removing a policy and charging control rule. In one example, this could occur when the user equipment is turned off. However, other situations may be foreseen wherein this is contemplated, e.g. wherein the removal of a policy and charging control rule is performed followed by the automatic configuration of preinstalled or default rules.

The method according to the present invention foresees, in other words, the configuration of an event subscription, wherein the subscription is made to events dependent on a location of a user equipment and wherein the event subscription is specific to a group of cells, and wherein the policy and charging control rules can be installed, modified or removed in dependence of the detected event if decided accordingly by a first network entity. In this way, the method of the present invention is able to correctly implement the rules according to the location and area of a user equipment in a very reliable way while relying on the signalling associated to the event subscription which is configured specifically for a group of cells corresponding to a given area. In this way, the rules can be correctly applied while maintaining the requirements for signalling at a minimum level. For example, if it is required to change the rules only when a user equipment is moving out of a group of cells comprising a large number of cells, then the event subscription does not need to detect and notify every movement of the user equipment within the large number of cells comprised in this group. On the contrary, the method would configure the event subscription only to detect and notify when the user equipment is moving outside of the group of cells. Such a solution would imply that the correct rules are applied at any given time while avoid unnecessary signalling linked for instance to the user equipment changing cells within the same group. Accordingly, the first network entity would not need to perform any other non needed operation. Such movements would in fact not require any change, in this example, of the charging rule and any related signalling would only be an unnecessary load and waste of network resources. The method of the present invention, as seen above, would avoid such inconveniences thus providing a reliable application of rules at any given time while keeping the signalling resources and corresponding network resources at a minimum.

According to a further embodiment, the method depicted in FIG. 2 may further comprise event subscription which is further dependent on a user profile associated to a user of the user equipment or dependent on policy criteria associated to the user. In other words, information of a user profile associated to a user of a user equipment may, according to this embodiment, influence the event subscription. For example, if a user profile indicates that for the given user no location based rules shall be applied, then a corresponding event subscription is configured. The user profile may however provide more detailed indications like for instance which areas should be regarded as a home area where for instance a special rate (in one example, a flat rate or a zero rate) shall be applied when the user is in that area. Similarly, the user profile may indicate other areas defined for a given user, like an area associated to the office or working place for a given user, an area associated to a shopping centre, an area associated to an entertainment structure like a stadium, any other specific area that may need to be associated to a user. Independently from or jointly with the association of the event subscription to the user profile previously mentioned, the event subscription may further depend on policy criteria associated to the user. In other words, the event subscription may be configured by taking optionally into account also policy criteria defined for a given user. For instance, the policy criteria may specify the granularity of location changes that need to be detected for a given user. In one example, information may specify whether for a given user there is a need to monitor and detect each change of position or location with a high detail, e.g. whenever the user changes a cell, or, according to other examples, only when the user changes a given group of cells. In case the network is a GPRS network, a condition may be defined according to which changes of location of the user should be monitored only when the user changes SGSN serving node. In such a case, for example, a group of cells can be configured as the cells belonging to the same SGSN and the event subscription specific to this group of cells may be configured to subscribe only to events corresponding to the user equipment leaving or entering the group of cells corresponding to the given SGSN. Accordingly, through the use of policy criteria it is possible to finally adapt the granularity of the event subscription, which will accordingly be triggered by corresponding changes of location of the user. In other words, the event subscription according to this embodiment can be flexibly adapted according to the user profile or policy criteria. This leads to an advantage of enabling a flexible configuration of the event subscription according to circumstances while avoiding intensive signalling resources.

According to a further embodiment, the event subscription of the method illustrated in FIG. 2 may be configured on the basis of configuration information received at the second network entity 200 from the first network entity PCRF 100 or from a further network entity. In other words, according to an example, the first network entity 100 may prepare configuration information and send them to the PCEF 200. Thereafter, the second network entity 200 configures the event subscription on the basis of the configuration information received from the network entity 100. In further embodiments, the configuration information may be received from a further network entity like for instance a network management device or another network node. Thus, according to an example, a network manager may determine configuration information and send them to the network entity 200. Therein, the event subscription is configured on the basis of the configuration information received. The advantage consists in an easy configuration of the event subscription independently of the source.

The configuration information described above may, in a further embodiment of a method according to the invention, further comprise predetermined values corresponding to predetermined event subscription. In other words, it is not needed to send the entire subscription in the configuration information in order to allow the second network entity 200 to configure the event subscription. In one example, in fact, it is enough to send only values which are known to be in correspondence with predetermined event subscriptions. For instance, in one embodiment it is enough to send index values indexing to a look-up table or to a database where predetermined subscriptions are stored. The invention is anyway not limited to a look-up table or to a database but also other means may be foreseen as long as they allow the second network entity 200 to determine a given event subscription or events to be included in the event subscription starting from configuration information. The corresponding advantage consists in that the signalling is further reduced since lees information (not the entire information relating to the event subscription) are sent over the network.

In a further embodiment, the event subscription may be received at the second network entity 200 from at least one among the first network entity and a further network entity. The further network entity may be in one example a network management network device or another network device. According to this modification, the entire event subscription may be sent to the second network entity 200. This could be particularly helpful upon first configuration or initialization of the first network entity 200.

According to another modification of the method, the event subscription may be instead preinstalled in the second network entity 200. This could be the case wherein, for instance, a network administrator or network manager has configured the network entity 200 with a predetermined event subscription. In another example, the event subscription may be preinstalled at a production or delivery site.

According to a modification of a method embodying the invention, the event subscription may comprise a subscription to at least an event wherein at least an event is dependent on a location of a user equipment. In other words, the event subscription comprising at least an event dependent on the location of a user equipment is capable of determining events related to the location or a change in the location of a user equipment. Accordingly, when a user equipment changes location or position and this change triggers an event associated to the event subscription, a notification is made according to the method as depicted for instance in FIG. 2.

According to a further modification, the at least an event may further depend on at least one among a user profile associated to a user of the user equipment and policy criteria associated to the user. In other words, the events to be included in the event subscription may be chosen depending on the user profile associated to a user or depending on policy criteria associated to the user. The user profile may for instance specify information specific for a given user, like for instance several and different areas associated to group of cells and specific for a given user. The policy criteria may in some examples include information defining some criteria to be followed when choosing the events to be included in the event subscription. Such criteria may in some examples specify the granularity of location or position changes that need to be detected for a given user. According to the present invention, therefore, event subscriptions can be determined on the basis of the user profile or policy criteria. The event subscription may be ready-to-use event subscriptions. Alternatively, a subscription may instead be determined in real time, for instance by selecting the events to include in the event subscription on the basis of user profiles or policy criteria for a given user.

According to a further embodiment, the step of configuring S110 may comprise installing the event subscription on the second entity.

According to a further embodiment, the detected event of the method illustrated in FIG. 2 may further comprise at least the user equipment entering one of the group of cells or leaving one of the group of cells. In other words, when a user equipment enter or leaves one of the group of cells then an event is detected. Thereafter, a notification is made to the first network entity 100 which, consequently, determines whether to install, modify or remove a policy and charging control rule.

According to a further embodiment, the method embodying the invention as illustrated in the flow chart of FIG. 2 may further comprise, when it is determined to install a policy and charging control rule in dependence of the detected event, at least one step among installing a new policy and charging control rule, modifying an existing policy and charging control rule and removing an existing policy and charging control rule. In other words, when the step of determining S130 determines to install, modify or remove a policy and charging control rule, then the method foresees the corresponding step of installing, modifying or removing an existing policy and charging control rule. In other words, following the detection and the decision whether to install, modify or remove a rule, the corresponding step is actually performed and executed.

According to a further embodiment, the method embodying the invention as depicted in the flow chart of FIG. 2 may optionally further comprise a step of generating a set of event subscriptions comprising at least one event subscription, each event subscription being specific to a group of cells, and wherein the step of configuring the event subscription comprises selecting the subscription from the set of subscriptions. In other words, the event subscription may be configured by selecting or choosing an event subscription from a set comprising one or more predefined event subscriptions. The set of subscriptions may be predetermined and referred to by e.g. indexes or ID values unambiguously referring to one of the subscription within the set.

According to a further embodiment, the first group of cells according to the present invention is a group of cells comprising the cell wherein the user equipment is currently located.

According to a further embodiment, the method embodying the invention as depicted for instance in FIG. 2 may further comprise a step of selecting the at least one cell comprised in one among the at least two groups of cells with reference to one among a user profile associated to a user of the user equipment and policy criteria associated to the user. In other words, the group of cells can be chosen or designed so as to correspond to an area according to a user profile associated to a user. For instance, when the user profile defines a given area like a home area for the user, a given number of cells can be grouped together in order to form a first group of cells corresponding to the home area indicated in the user profile. According to another example, a given number of cells may be grouped to form a group of cells according to policy criteria associated to a user. For example, if policy criteria indicate that certain rules are to be applied to a given area, the group of cells is chosen in correspondence to the area indicated in the policy criteria. According to this embodiment, by choosing which cells to group in a group of cells, the granularity of the area can also be controlled in dependence of the user profile or policy criteria.

According to a further embodiment, the method embodying the invention as depicted for instance in FIG. 2 may further optionally, comprise a step of establishing or modifying a communication session between the user equipment and the second entity 200, a step of requesting policy and charging rules for said communication sessions from the first network entity 100 and wherein the step of configuring the event subscription is performed in response to the step of requesting the policy and charging rules. It is also noted that the step of requesting policy and charging rules may be omitted. In such a case, a step of configuring the event subscription is performed in response to the establishment of a communication session. According to this embodiment, the step of configuring the event subscription is performed in consequence to the request for a policy and charging rules to apply to a newly established or modified communication session between a user equipment and the second network entity 200. Thus, according to the present embodiment, the configuration of the event subscription is performed in correspondence of a communication session. Thus, unnecessary signalling, for instance associated to the movement of a user equipment in standby when no communication is performed, can be further avoided.

Figure 3:
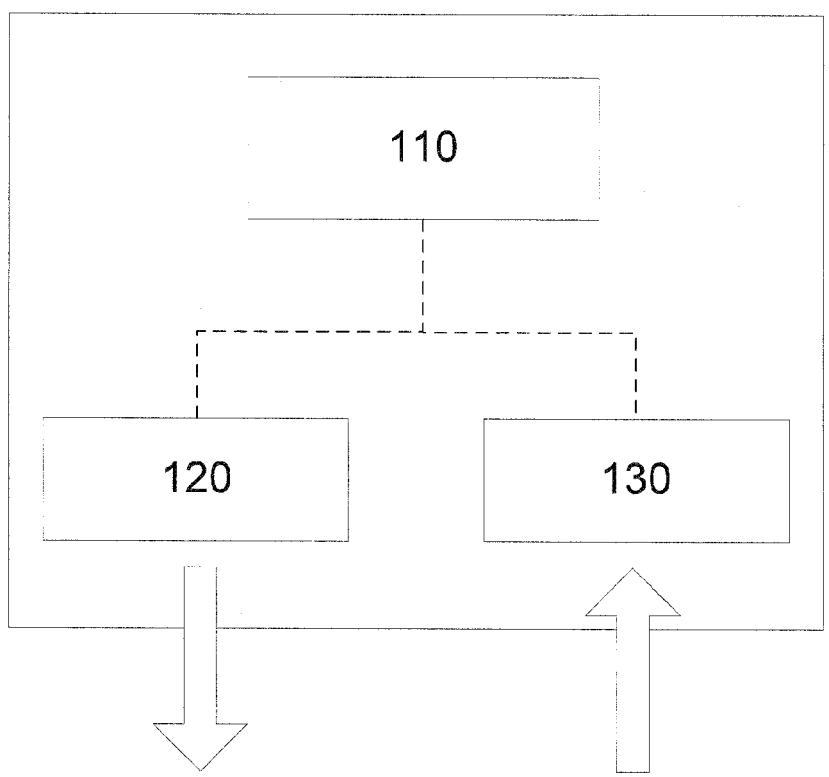
FIG. 3 is a block functional diagram of a network entity configured to perform a policy and charging rules function according to an embodiment of the present invention.

Reference will now be made to FIG. 3 representing a schematic block diagram of a further embodiment of the present invention directed to a network entity 100 configured to perform a policy and charging rules function in a communication network. As already observed, the network entity can be a network node in one example or may be implemented by distributing in a suitable way the different functionalities among several network devices. In the present embodiment, the network entity is also specifically configured to perform a policy and charging rules function. It is however noted that the features that will be described in the following embodiment can also be implemented in a separate network entity not configured to perform a policy and charging rules function.

The network entity 100 according to the present embodiment comprises a controller 110 for determining event subscription information on the basis of a location of a user equipment, the event subscription information being specific to a first group of cells and wherein the first group of cells is comprised in at least two groups of cells. It is noted that each group of cells includes at least one cell. For the group of cells and the event subscription the same considerations as made with reference to the method embodying the invention as depicted in FIG. 2 are valid also for the present embodiment. In other words, the controller 110 determines information corresponding to an event subscription on the basis of a location of a user equipment and wherein the event subscription to which said event subscription information correspond to are specific to a first group of cells.

The network entity 100 of the present embodiment further comprises a transmitter 120 for sending the event subscription information to a second network entity 200 and a receiver 130 for receiving from the second network entity 200 a notification corresponding to an event detected according to the event subscription information. In other words, the first network entity 100 sends the information relating to the event subscription to the second network entity. Consequently, the second network entity 200 issues notification corresponding to an event subscription relating to the event subscription information. These notifications are received by the receiver 130 of the first network entity 100.

Furthermore, the controller 110 of the network entity 100 according to the present embodiment is adapted to further determine, upon receipt of the notification, whether to instruct the second network entity to install, modify or remove a policy and charging control rule in dependence of the detected event. In other words, once a notification is received from the second network entity 200 that an event has been detected corresponding to the event subscription information, then the first network entity decides whether to instruct the second network entity to install, modify or remove a policy and charging control rule in dependence of the notified event.

The advantage achieved by the present embodiment consists in that it is provided a network entity capable of determining event subscription information relating to an event subscription that can be subsequently configured in a flexible and reliable manner in order to detect events dependent on the location of a user equipment while maintaining the network resource requirements for signalling at a minimum. The same network entity is also adapted to take decisions as to which rules to put in place depending on the location of a user equipment while maintaining the signalling at a minimum.

According to a further embodiment, the controller 110 of the network entity 100 may be further adapted to further determine the event subscription on the basis of at least one among a user profile associated to a user of the user equipment and policy criteria associated to the user. With this respect, the same consideration as made with reference to the method still applies for the network entity 100 according to the present embodiment. Thus, the network entity 100 provides the further advantage of enabling a more flexible determination of the information relating to the event subscription, thus resulting in the determination of the information capable of generating event subscription tailored according to the needs or the circumstances while reducing the signalling resources required.

According to a further embodiment, the event subscription information related to the network entity 100 according to the present invention may further comprise a subscription to at least an event wherein the at least an event depends on a location of the user equipment. Furthermore, the transmitter 120 of the network entity 100 according to the present embodiment may be further adapted to send the event subscription information to the second network entity 200 and to instruct the second network entity to configure the event subscription. In other words, the network entity 100 may be further adapted to determine information corresponding to an event subscription and instruct the second network entity 200 to configure the event subscription according to the event subscription information.

According to a further embodiment, the event subscription information of the network entity 100 according to the present invention may further comprise predetermined values corresponding to a subscription to at least an event wherein the at least an event depends on a location of the user equipment. According to this embodiment, the transmitter 120 of the network entity 100 is further adapted to send the predetermined values comprised in the event subscription information to the second network entity. In other words, the first network entity 100, when determining the information of the event subscription, may either send detailed information comprising the events making up the event subscription or predetermined values corresponding to an event subscription, like for example an index value or an ID value.

According to a further embodiment, the controller 110 of the network entity 100 according to the present invention may be further adapted to instruct the second network entity 200 to install the event subscription corresponding to the predetermined values sent. In this way, the first network entity 100 is capable of instructing the second network entity 200 to install an event subscription by sending only a reduced amount of information, like for instance an ID or index value, in order to configure the event subscription.

According to a further embodiment of the present invention, the controller 110 of the network entity 100 of the present invention may be further adapted to maintain a relationship among the event subscription information and a communication session between a user equipment and the second network entity 200. Accordingly, the network entity 100 is capable of ensuring that the correct rules are always applied to the corresponding communication session in dependence of the location of the user. This results in an increased reliability of the entire system while minimizing the signalling resources. In fact, the event subscriptions are specific to the needs and locations of the user equipment as also explained above.

According to a further embodiment, the controller 110 of the network entity 100 according to the present invention may be further adapted to instruct, when it is determined to install, modify or remove a policy and charging control rule in dependence of the detected event, the second network entity 200 to perform a corresponding operation of, respectively, installing a new policy and charging control rule, modifying an existing policy and charging control rule and removing an existing policy and charging control rule. In other words, the network entity 100 is further adapted to instruct the second network entity 200 to modify, install or remove policy and charging control rules when the first network entity 100 has accordingly decided in dependence of the location of the user equipment.

Figure 4:
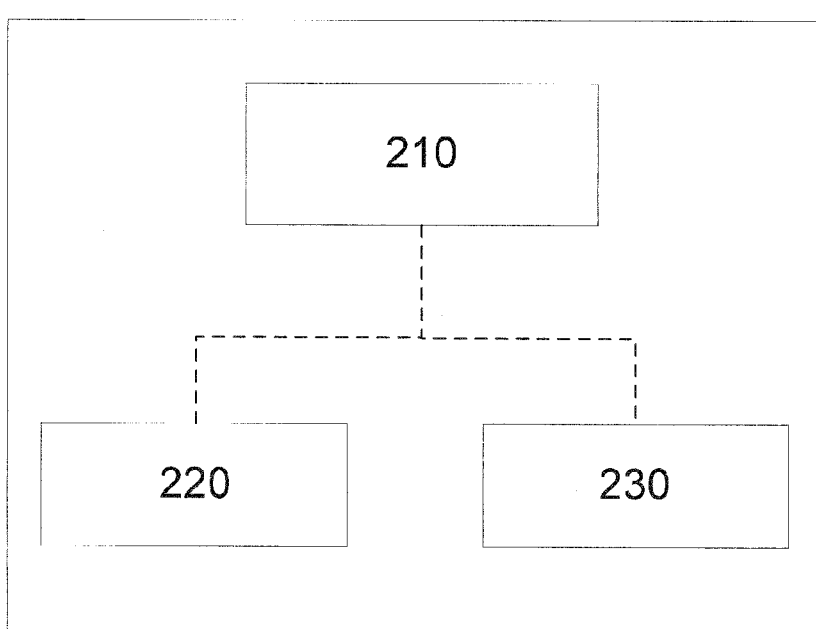
FIG. 4 is a block functional diagram of a network entity configured to perform a policy and charging enforcement function according to another embodiment of the present invention.

Reference will now be made to FIG. 4 illustrating a schematic block diagram of a network entity 200 according to a further embodiment of the present invention. The network entity 200 is configured to perform a policy and charging enforcement function for enforcing policy and charging rules in at least two groups of cells in a communication network wherein each group of cells include at least one cell. For the cells and for the groups of cells the same considerations made with reference to the network depicted in FIG. 1 and to the method illustrated in FIG. 2 are valid also here. The network entity 200 according to the present embodiment comprises a controller 210 for configuring, for a first one of at least two groups of cells, at least an event subscription which is dependent on a location of a user equipment and wherein the event subscription is specific to the first group of cells. In other words, the network entity 200 is capable of configuring an event subscription according to which it is possible to monitor location or position of a user equipment in a manner which is specific to the first group of cells. In this way, the event subscription can be configured according to the needs for the first group of cells.

The network entity 200 according to the present invention further comprises a detector 220 for detecting an event associated with the configured event subscription and a receiver 230 adapted to receive instructions from a first network entity 100 to install, modify or remove policy and charging rules depending on the detected event. In other words, the network entity 200 configures an event subscription in a way specific to an area of interest corresponding to the first group of cells, detects only those events relating to the event subscription and, upon instruction from another network entity, installs, modify or remove policy and charging rules in dependence of the detected event. In this way, the network entity 200 is capable of enforcing always the correct rules that should be applied to a given area corresponding to a given group of cells depending on the location of a user equipment and while maintaining the signalling at a minimum.

According to a further embodiment, the controller 210 of the network entity 200 may be further adapted to receive event subscription information from a first network entity or a further network entity. In fact, the subscription information may be sent by the first network entity 100 also adapted to perform a policy and charging rules function, i.e. deciding or managing policy and charging rules function, or by another network entity as represented for instance by a network management node. In fact, the information needed for configuring the event subscription do not necessarily need to be send by a network entity also capable of performing a policy and charging rules function but can be sent by any other network entity or device as long as this is capable of determining the information needed for configuring the event subscription specific to an area or to a given group of cells. In this case, it is implied that the controller is capable of receiving data from one or more network entities or devices.

According to a further embodiment, the event subscription information of the network entity 200 according to the present embodiment may comprise one among a subscription to at least an event dependent on a location of the user equipment and predetermined values corresponding to predetermined event subscriptions. In other words, the event subscription information received from another network entity or device may either comprise detailed information relating to a subscription or to an event making up the subscription or may alternatively comprise values like index or ID values corresponding to a predetermined event subscription. In this second case, a further reduction of signalling can be achieved since the predetermined values typically involve the transmission of a lower amount of data.

According to a further embodiment, the controller 210 of the network entity 200 according to the present invention may optionally be further adapted to maintain a relationship among the event subscription and a communication session between a user equipment and the second network entity. In this way, the network entity 200 is capable of enforcing the correct rules against the given communication session depending on the location of a user while requiring a minimum amount of signalling.

According to a further embodiment of the present invention, the controller 210 of the network entity 200 may optionally be further adapted to exchange information corresponding to the event subscription information with a further network entity configured to communicate with the user equipment. The further network entity may be for instance a network node responsible for the coordination of the exchange of information among different cells. In one example, as described in more detail later, the further network entity may be a SGSN network node in a GPRS network. According to this embodiment, the network entity 200 is capable of configuring further network devices in order to ensure that only the signalling corresponding to the configured event subscription is actually exchanged. Thus, the network as a whole can achieve a reduction in the signalling required.

According to a further embodiment, the network entity 200 may optionally further comprise a transmitter for sending a notification of the detected event to the first entity 100. In such a case, the network entity 100 is able to determine whether any operation is needed with respect to the policy and charging rules in dependence of the detected location of the user equipment. With this respect, it is noted that such communication occurs only when the network entity 200 triggers a notification according to the event subscription configured specifically for a given group of cells.

According to a further embodiment of the present invention, a communication system is provided for performing policy and charging in accordance with a location of a user equipment in a communication network like the one depicted in FIG. 1, wherein the communication system comprises a first network entity as depicted in FIG. 3 and as described in the embodiments above and a second network entity 200 as depicted in FIG. 4 and described in the embodiments above.

A communication system according to an embodiment of the present invention will now be described in more detail with reference to FIG. 1. This communication system is adapted to perform policy and charging in a communication network as the one depicted in FIG. 1. This communication system comprises a first network entity 100 including a first controller 110 for determining event subscription information on the basis of a location of a user equipment, wherein the event subscription information are specific to a first group of cells and wherein the first group of cells is comprised in at least two groups of cells. It is noted that each group of cells includes at least one cell. As described above with reference to FIG. 1, each cell may be represented by the cell 21, 22 or 23 and each group of cells may comprise one or more of the depicted cells 21, 22 or 23. As already noted, two groups of cells may also share none, one, more or all of the cells comprised in the communication network.

The communication system according to the present embodiment further includes a second network entity 200 comprising a second controller 210 for configuring, for a first one of the at least two groups of cells and on the basis of the subscription information, an event subscription dependent on a location of a user equipment wherein the event subscription is specific to the first group of cells. The second network entity 200 further comprises a detector 220 for detecting an event associated with the configured event subscription and for sending to the first network entity 100 a notification corresponding to an event detected according to the event subscription information. The first controller 100 included in the communication system is further adapted to further determine, upon receipt of the notification, whether to instruct the second network entity 200 to install, modify or remove a policy and charging control rule in dependence of the detected event. The communication system according to this embodiment achieves similar and corresponding advantages as achieved by the method and a network entity of the present invention, namely enforcing the correct policy and charging rules depending on the location of a user equipment while maintaining the required signalling at a minimum.

According to a further embodiment, the present invention provides a computer program for performing a policy and charging rules function in accordance with a location of a user equipment in a communication network wherein the computer program comprises instructions configured, when executed on a programmable system, to cause the programmable system to carry out the method steps according to one of the methods embodying the present invention as described above. The programmable system may be a distributed programmable system in one example.

More in detail, according to a further embodiment, a computer program is provided for performing a policy and charging rules function in accordance with a location of a user equipment in a communication network wherein the computer program includes instructions configured to cause, when executed on a programmable device, the programmable device to carry out a step of determining event subscription information on the basis of a location of a user equipment, the event subscription being specific to a first group of cells and a first group of cells comprised in at least two groups of cells. It is noted that each group of cells includes at least one cell. The same considerations made above with reference to the communication network depicted in FIG. 1 or the method illustrated in FIG. 2 are also valid here. The computer program then foresees a step of sending the event subscription information to a second network entity and receiving from the second network entity a notification corresponding to an event detected according to the event subscription information. The computer program then is adapted to carry out a step of further determining, upon receipt of a notification, whether to instruct the second network entity to install, modify or remove a policy and charging control rule in dependence of the detected event.

According to another embodiment of the present invention, it is provided a computer program for performing, in accordance with the location of a user equipment in a communication network, a policy and charging enforcement function for enforcing policy and charging rules in at least two groups of cells, each group of cells including at least one cell, wherein the computer program includes instructions configured to cause, when executed on a programmable device, the programmable device to carry out steps of configuring, for a first one for the at least two groups of cells, at least an event subscription which is dependent on a location of a user equipment and wherein the event subscription is specific to the first group of cells. The computer program according to this embodiment further causes the programmable device to carry out the steps of detecting an event associated with the configured event subscription and receiving instructions from a first network entity to install policy and charging rules depending on the detected event.

The programmable device or distributed programmable system on which said computer programs can be indifferently executed may be represented by any type of device comprising typical means like processors and memories and input/output devices suitable for executing instructions of a corresponding computer program. The above mentioned computer programs may also be executed on a distributed programmable system. Such a distributed programmable system is represented by any combination of programmable devices that can communicate with each other through a network or a bus. In such a case, the computer program is suitably distributed among the different programmable devices constituting the distributed programmable system in order to suitably execute the computer program above described.

Figure 5:
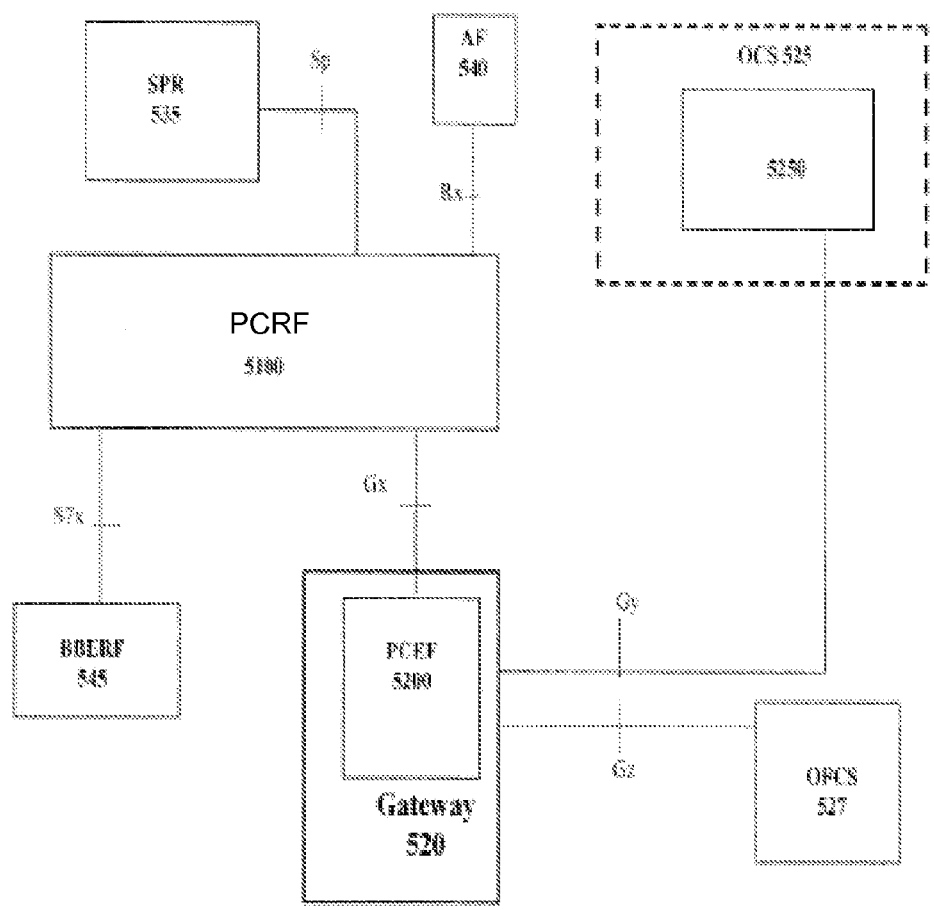
FIG. 5 is a functional block diagram of a policy and charging control (PCC) architecture according to another embodiment of the present invention.

Reference will now be made to FIG. 5 presenting a further embodiment of a communication system to which the present invention can be applied to. The system depicted in FIG. 5 represents a policy and charging control (PCC) architecture that permits integrating both policy and charging control optimizing the information flow according to the present embodiment. The architecture of FIG. 5 is based on the architecture of a policy and charging control as defined for instance in standard TS23.203 specifying the PCC functionalities for Evolved 3GPP Packet Switched domain. Such architecture is applicable for both 3GPP accesses (GERAN/UTRAN/E-UTRAN) and non-3GPP accesses. In the following, it will be described how the present embodiment of the invention differs from the architecture as described in the cited standard.

The system depicted in FIG. 5 comprises a Policy and Charging Rules Function (PCRF) 5100. The element referenced with 5200 represents an element having a Policy and Control Charging Rules Function (PCRF). It is noted that the element 5100 is in the present embodiment an example of the first network entity 100 as depicted in FIG. 1 or in FIG. 3. Similarly, the element 5200 is in the present embodiment an example of the second network entity 200 as represented in FIG. 1 or 4. In the present embodiment, the element 5200 may be comprised within a gateway 520. The elements PCRF 5100 and PCEF 5200 are adapted to exchange information across the interface Gx reference point. In the following, it will be explained that this interface may be based on the standard interface. According to circumstances, this interface may require modifications as apparent from the following. The PCRF 5100 element is capable of exchanging information with a subscription profile repository (SPR) 535 over a communication interface Sp (Sp reference point) and with an application function (AF) 540 over a communication interface represented by the Rx reference point. The PCRF 5100 is also adapted to communicate with the element bearer binding and event reporting function (BBERF) 545 over a communication interface represented by the S7x reference point.

Reference has been made to the term element. It is noted that an element according to the present embodiment and the present invention is to be regarded as a network device or as part of a network device according to the implementation that the skilled person would consider in view of the circumstances. It is also possible to implement one or all of said elements by distributing the necessary functionalities in a suitable way among different network devices as the skilled person would recognize.

The gateway 520 is adapted to exchange information with an offline charging system OFCS 527 and with an online charging system OCS 525 over, respectively, communication interfaces represented by the Gz and Gy reference points. The online charging system OCS 525 comprises a service data flow based credit control 5250. The gateway 520 is capable of exchanging information with the service data flow based credit control element 5250 over the Gy reference point.

As it will be explained in more detail in the following, in an example in which the PCC architecture depicted in FIG. 5 is applied to GPRS network, the gateway 520 may be implemented in a GGSN network node. In another example, in which the PCC architecture of FIG. 5 is applied to a WLAN network, the gateway 520 may be implemented in a Packet Data Gateway (PDG) network device.

In the following, more details will be provided with reference to the several elements depicted in FIG. 5 according to the present embodiment of the invention.

The PORT (Policy and Charging Rules Function) 5100 is a functional element that encompasses policy control decision and flow based charging control functionalities. These 2 functionalities may be regarded as the heritage of the release 6 logical entities PDF and ORF respectively. The PORT 5100 provides network control regarding the service data flow detection, gating, QoS and flow based charging (except credit management) towards the POET 5200. The PORT 5100 receives session and media related information from the AF 540 and informs the AF 540 of traffic plane events. The PORT 5100 shall provision PCC Rules to the PCEF 5200 via the Gx reference point.

The PCRF PCC Rule decisions may be based on one or more of the following:
- Information obtained from the AF via the Rx reference point, e.g. the session, media and subscriber related information;
- Information obtained from the PCEF 5200 via the Gx reference point, e.g. IP-CAN bearer attributes, request type, subscriber related information and location information.
- Information obtained from the SPR via the Sp reference point, e.g. subscriber and service related data.
- Own PORT pre-configured information.

In other words, the PCRF acts as a policy decision point, evaluating conditions based for instance on the information above indicated. The results of these evaluations constitute or determine the information included in the PCC rules that are installed and enforced in the PCEF.

The PORT 5100 shall inform the POET 5200 through the use of PCC rules on the treatment of each service data flow that is under PCC control, in accordance with the PCRF policy decision(s).

The Application Function (AF) 540 is an element offering applications in which service is delivered in a different layer (i.e. transport layer) from the one the service has been requested (i.e. signalling layer), the control of IP bearer resources according to what has been negotiated. One example of an AF is the Proxy Call Session Control Function (P-CSCF) of the IM ON subsystem. The AF 540 shall communicate with the PCRF 5100 to transfer dynamic session information (i.e. description of the media to be delivered in the transport layer). This communication is performed using the Rx interface.

The PCEF 5200 encompasses service data flow detection (based on the filters definitions included in the PCC rules), as well as online and offline charging interactions (not described here) and policy enforcement. Since the PCEF 5200 is the one handling the bearers, it is where the QoS is being enforced for the bearer according to the QoS information coming from the PCRF 5100. This functional entity is located at the Gateway (e.g. GGSN in the GPRS case, and COG in the WLAN case. As mentioned, however, the invention is not limited to these two cases).

Figure 6:
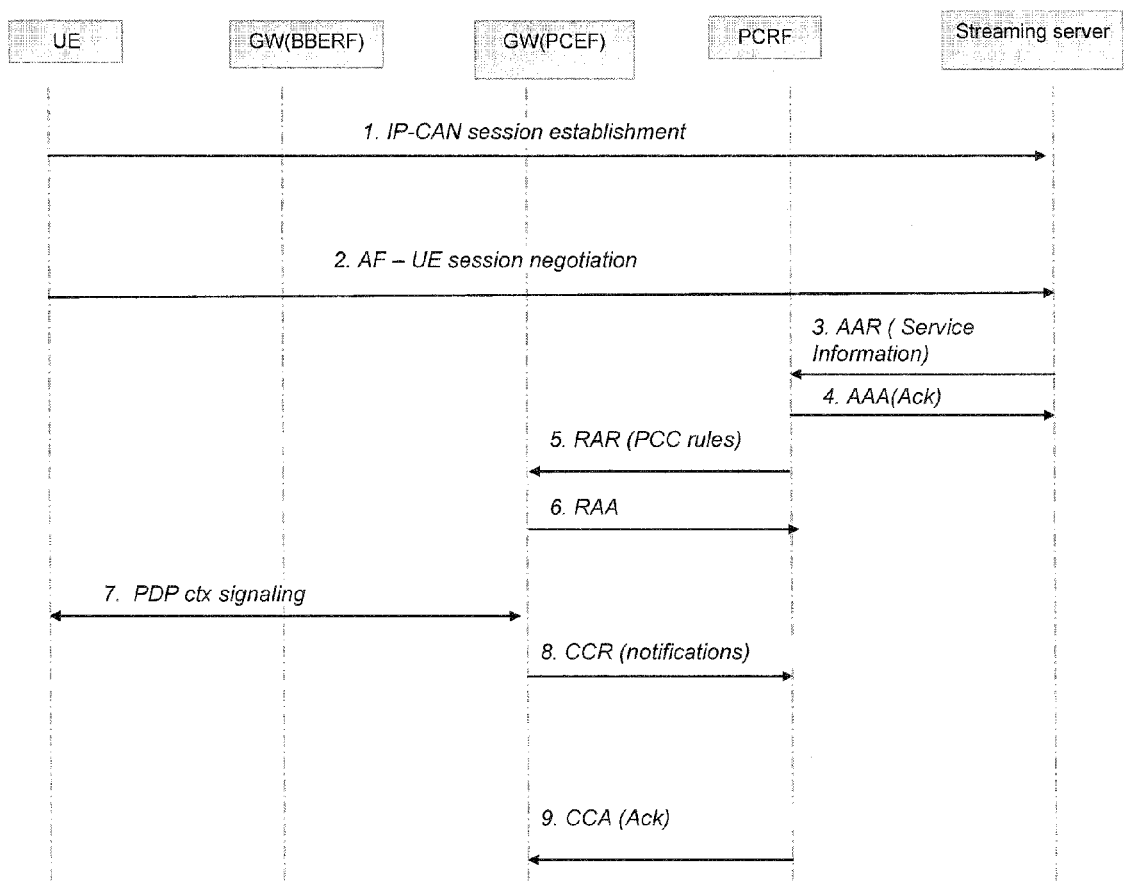
FIG. 6 is a schematic flow chart illustrating an example of a user equipment accessing a streaming server.

Reference will now be made to FIG. 6 showing an example applied to the access to a streaming server. In FIG. 6 a user equipment UE is depicted corresponding, according to the embodiment of the present invention, to the user equipment 50 of FIG. 1. The element GW (BBERF) represents an example of the element BBERF 545 of FIG. 5 while the element GW (PCEF) of FIG. 6 an example of the PCEF element 5200 of FIG. 5 or of the second network entity of FIG. 1. Similarly, the element PCRF of FIG. 6 is an example of to the element PCRF 5100 of FIG. 5 or of the first network entity 100 of FIG. 1 or FIG. 3. The streaming server depicted in FIG. 6 is any type of server capable of providing streaming services. It is observed that FIG. 6 is a mere illustrative example showing how access is established between a user equipment and a streaming server. However, the same applies also to other cases wherein a user equipment accesses different types of services including voice and data services. The data services can be real time and non real time data services, including voice over IP services.

According to the example depicted in FIG. 6, an access to a streaming server comprises the following steps:
1. The terminal establishes an IP-CAN session.
2. The user connects to a streaming server and negotiates the session. During the session negotiation the IP ports used by the end points, the type of media (audio, video, etc) and the QoS parameters are defined.
3. The streaming server provides the session information that has been negotiated to the PCRF.
4. The PCRF checks that the session information received is according to the operator defined policies, stores the service information and responds with acknowledgement to the application server.
5. The PCRF determines the PCC rules to install according to defined policies, e.g. location based policies and sends a RAR request to request that the GW installs, modifies or removes PCC. Such operation is for instance an operation performed by the controller 110 of the entity of FIG. 3.
6. The GW sends an RAA to acknowledge the RAR.
7. GW (BBERF) initiates the procedure to create/update the PDP ctx request message.
8. GW PCEF) sends the notifications needed to the PCRF.
9. PCRF stores the information coming in the notification and acknowledges the CCR with a CCA.

Within a communication system as depicted in FIG. 5 or in FIG. 1, mobile operators are interested in being able to perform a policy decision that is based on location and in being able to change the result of the policy evaluation when the location of the user changes.

The following are some use cases in which it is needed to perform policy decisions that are based on location information that may be received in real-time:

Home zone Price: The operator offers a service (e.g. mobile Internet) at a cheaper rate when the user is at home.

Location Based Bandwidth restrictions: The operator applies bandwidth limitation in certain locations where it is foreseen congestion situations like stadiums, commercial centers in weekend, and beaches in summer, etc.

Multi-Access Terminal Steering: In a scenario of fix mobile convergence, where a multi-access terminal has the possibility to connect to several accesses, the decision of what access shall be used can be based on several parameters, like, user preferences, congestion situation, and also location information. The PCRF could implement this decision for which it is required to receive accuracy and update location information of the user. In this case the PCRF is aware of the locations of the user where he/she potentially could be connected through several accesses, as for example, in his home area, or office area.

Corporative mobile subscriptions: In the case of a user that is in the location of his work area or office building, and during working hours, the PCRF 5100 could assign certain especial QoS and charging conditions to the user. This could be useful for corporative mobile subscriptions, where the employee is allowed to use the mobile for private usages, but the conditions could be restricted when he is out of the working area.

Content insertion: One of the functionalities that could be performed in the PCRF 5100 is what is called content insertion. This functionality consists in inserting certain content in the user pay-load, for example for advertisement purposes. An application is the introduction of certain information related with the area where the user is.

Redirection: the PCRF 5100 may return certain redirection code to the PCEF 5200 indicating that the user shall be redirected to certain URL. An application of this feature may be related with location info: for example, when the user equipment enters certain location areas then it is redirected to certain portal or service that is especially applicable to that location. This could be associated not to the user equipment but to the user and thus to a user profile.

In 3GPP R6, the PCEF receives today the location information (consisting of cell id and service area id) from the SGSN. This is done at the PDP context establishment and at the PDP context modification according to a UE-initiated POP context modification or SGSN change. The PCEF sends this information towards the PCRF using the Gx reference point that is located between the Policy and Charging Rules Function (PCRF) and the Policy and Charging Enforcement Function (PCEF). The Gx interface point permits to include User Location Information (consisting on CGI/SAI) in the CCR requests.

Some peculiarities of the standard mechanism can be summarized as in the following:

The PCEF typically sends updated location information only updated at certain triggers such as UE-initiated PDP context modification or SGSN change this is due to the big amount of signalling. However, in the standard implementation, the level of granularity is not sufficient.

It is costly to have an always SGSN/GTP update for all the users and all the location updates. Thus, the corresponding signalling may require large amount of network resources.

This means that using a 3GPP R6 standard implementation, the PCRF is not able to get real-time update of the cell id of the use. Thus, the use cases described previously are not supported since they may require taking into account the location of the user at higher or variable levels of granularity.

In 3GPP R7 there have been some improvements in order to permit the GGSN to explicitly request towards the SGSN the report of CGI or SAI changes for the MS. However this standard implementation has the following limitation:

The GGSN has not enough information to know if for a specific MS it is needed to receive location information updates at the level of cell or service area in order to perform policy decisions based on the cell identifier It does not permit to indicate the specific cell identifiers or location areas for which it is needed to receive real-time location information.

Therefore, when the elements PCEF 5200 and PCRF 5100 as depicted in FIG. 5 are implemented according to the recommendations of the standards, the above limitations are experienced.

However, by implementing the elements PCEF 5200 and PCRF 5100 according to the present invention and as disclosed in more detail below for the present embodiment, several advantages will result. For instance, the application of the principles of the invention to the system of FIG. 5 results in a reduced amount of signalling and in the possibility of defining the granularity of the location changes according to needs and circumstances. More advantages will be apparent from the following description.

More in detail, according to the present embodiment as depicted in FIG. 5, the element PCRF 5100 is adapted to control and optimize the location information updates in order to perform location based policies. According to this embodiment, the definition of the Gx reference point is also extended in order to support the indication of the location area/cell ids that the PCEF needs to follow up. In this exemplary embodiment, a location policy handler is provided within the PCEF, not illustrated in the figure. The location policy handler controls under which circumstances the PCEF sends updated location information of the user. The policy handler of this embodiment corresponds to a particular and exemplary implementation of the detector 220 comprised in the network entity 200 which detects the event associated with the configured event subscription. In another embodiment, the location policy handler may be comprised is a PCEF component, that according to the notification criteria sent by the PCRF, detects the location events and informs the PCRF. In the present embodiment, this may depend on one or a combination of the following:

The current location of the user;

Whether the user has location based policies defined: e.g. if the user is at home, then the user has 0 rate.

What zones need to be followed-up; for example, for a certain user, only the home and the commercial centres that are on his/her city need to be followed-up.

The above considerations may be implemented in the controller 110 of the first network entity 100 or 5100 in order to configure the event subscriptions. The above points may also be considered when defining or selecting the cells making up a group of cells. Such group of cells, in fact, will correspond to the desired area in which a location of the user needs to be monitored. Since the subscription is specific to the desired group of cells, it is possible to configure the events that need to notified in a desired (also configurable) area and restrict the signalling only to the signalling needed corresponding to the event subscription applicable.

The PCRF then indicates to the PCEF when the location information should be updated. This may have an impact with respect to the current Gx standard definition, because the subscription to user location changes need to be extended in order to be able to control what type of location changes need to be done. Let us consider the example wherein location area update changes need to be done; within this type of changes it could be the case that it is needed to know only when the user enters or leaves a specific location area or set of location areas. Thus, in the case of cell update changes it is needed to indicate what cell updates are needed, i.e. that the user location is updated only when the user enters/leaves specific cell or set of cells. Note that the interesting areas to be monitored are potentially different from user to user. Thanks to the implementation of the present invention to the architecture depicted in FIG. 5, it is possible to allow the personalization of the user service.

Figure 7:
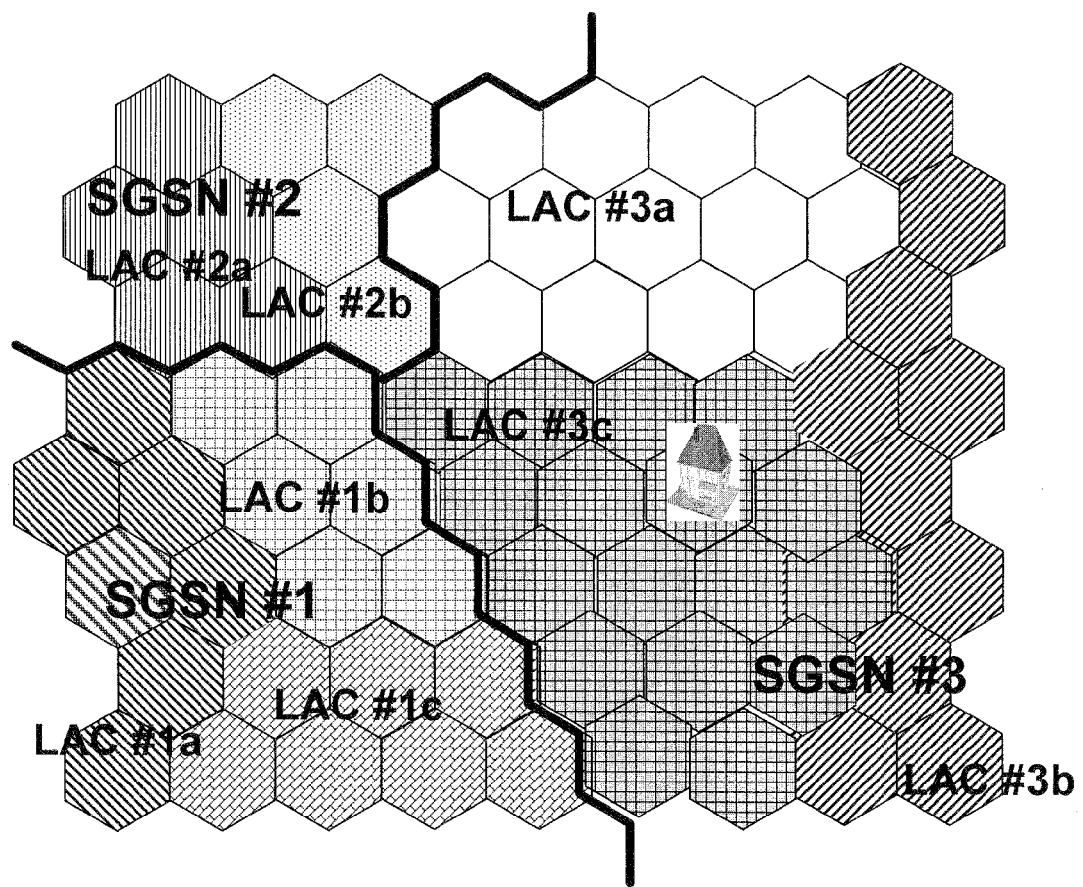
FIG. 7 shows an example of different zones that are attended by different network entities according to an embodiment of the present invention.

FIG. 7 shows an example of different zones that are attended by different SGSNs. Within each zone there are different location areas, each location area identified by a location area code (LAC), and within each LAC there are a set of cells identified by the cell-id. The cells may be arranged in groups corresponding to areas. These areas may then be chosen (and consequently the cells configured in corresponding groups) according e.g. to buildings or geographical locations of interests or according to other criteria, e.g. cells controlled by the same SGSN.

In this example, the PCRF is only interested in receiving location updates when the user is in the area attended by the SGSN #3 and when the user enters/leaves the cell id in which the user is at home (the home in this sense is not necessarily the home of the user, but may be a default area or cell or group of cells generically referred as home; in fact, it could correspond to the office where the user is working). When the user establishes the IP-CAN session the PCRF determines what granularity is needed for the location updates and installs this information in the PCEF (in this case the PCRF indicates to the PCEF that when the user enters/leaves the cell id corresponding to his home it should provide updated location information to the PCRF).

The PCEF then indicates to the SGSN that for this user only the location information updates when the user enter/leaves the cell id corresponding to his home are needed.

Description will now be made of how the elements depicted in the network system of FIG. 5 work according to an embodiment of the invention.

When a UE establishes an IP-CAN session (e.g. POP context activation), the PCEF sends a CCR request to the PCRF in order to request policy control information. The PCEF shall supply user identification and other attributes to allow the PCRF to identify the rules to be applied, such as the type of IP-CAN, the type of the radio access technology (e.g. UTRAN, GERAN, WLAN), the location information, the UE IP address, etc.

At this step, according to the location information that is received from the PCEF, the PCRF determines the granularity that is needed for the location information updates. If the user is in the location areas served by an SGSN that the PCRF' does not need to control in detail, the PCRF subscribes only the SGSN changes by means of the Event-Trigger AVP.

If the user is in a zone in which it is needed to perform a granular control, e.g., the operator may need to apply different policy decisions if the user is in a specific location area, in this case the PCRF returns an indication to the PCEF that indicates that every time the user changes the location area, the PCRF needs to be informed. In case only a location area needs to be controlled, the PCRF may indicate that only when the user enters or leaves a specific location are, the PCRF should be informed.

The above operations can be achieved by the step S110 of configuring, which configures the events to be monitored specifically for the group of cells corresponding to the location information received from the PCEF. The same may be determined by the controller 110 of the first entity according to FIG. 3, which determines information according to which the PCEF will configure the event subscriptions indicating the events to be monitored.

If the user is in a location in which the operator needs to apply policy decisions that depend on the specific cell or set of cells, the PCRF indicates that the location updates need to have the granularity of the cell, and which specific cell/set of cells need to be monitored. The PCEF should indicate the location update changes when the user enters/leaves those cells. This could be achieved by defining a given group of cells by selecting the cells to be included in the group. Then the event subscription configured specifically for this group of cells will ensure that the correct needed events are detected and notified.

For this, the PCEF may indicate to the SGSN in the create PDP ctx accept/modify PDP ctx the cell ids or service areas to monitor.

Once the IP-CAN session is established, the POSE reports the location updates according to the information that has been received from the PCRF.

It may be needed to extend the Gx reference point in order to enable the Location Based Policy Handler that is situated in the PCRF to indicate the level of granularity needed in the location information updates. Today the standard Event-Trigger only permits to subscribe to USER LOCATION CHANGE (13) in general. This value is used in the CCA and RAP commands by the PCRF to indicate that, upon a change in the user location, the PCEF shall inform the PCRF.

Figure 8:
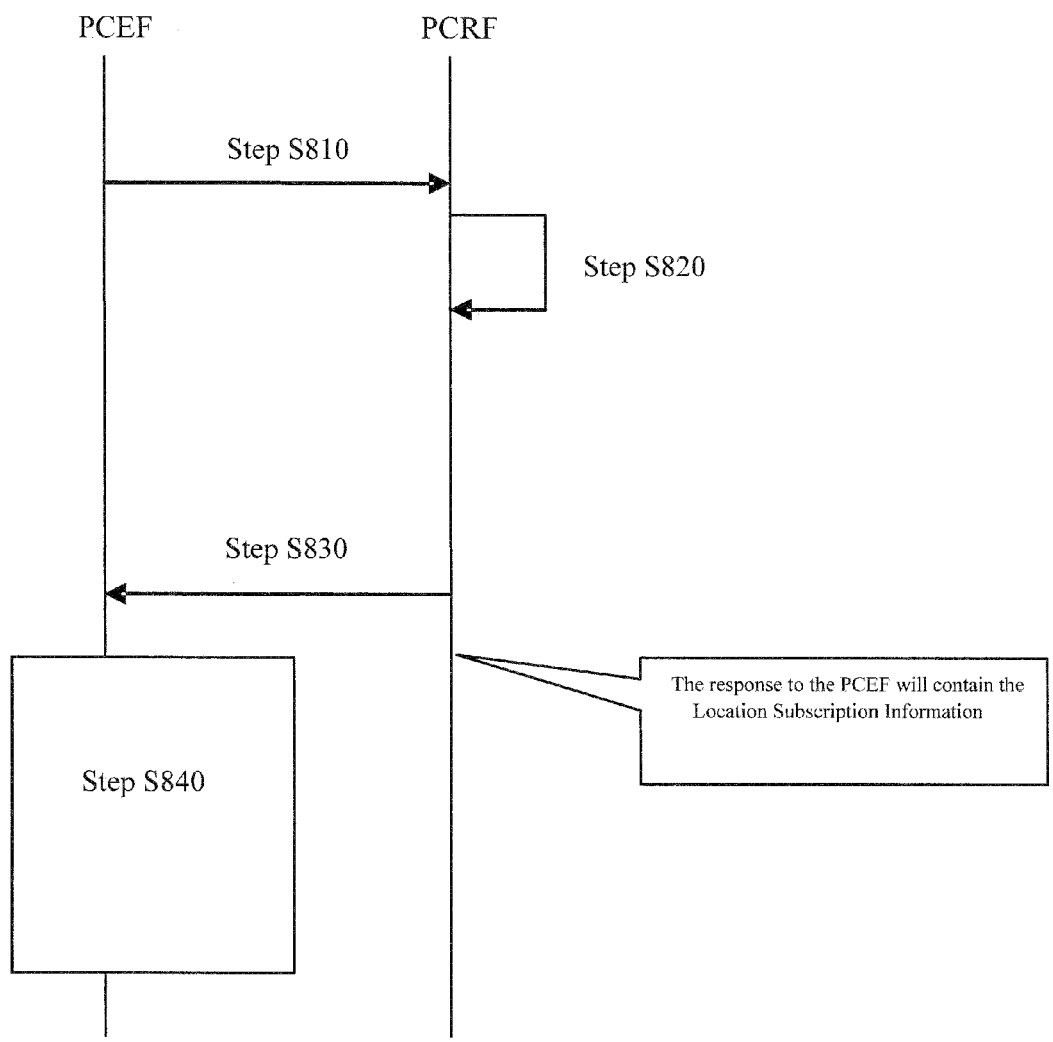
FIG. 8 is a schematic flow chart showing the establishment of a new IP-CAN session according to another embodiment of the present invention.

Reference will now be made to FIG. 8 showing a use case wherein a new IP-CAN session is established. This example shows location based policy handling at IP-CAN session establishment. According to the present embodiment, the following phases are executed:
1. The PCEF informs the PCRF of the establishment of a new IP-CAN Session. Among other information the PCEF provides UE identity information and the User Location Information.
2. The PORT stores the information received in the CCR and determines according to the user location information and the operator defined policies what level of granularity is needed for the user location updates, such as location area and likely specific location area identities, cell id and likely specific cell ids; this information is the Location Subscription Information. The PCRF also generates the PCC rules to be enforced in the PCEF which apply to the user.
3. The Subscription Location Information and the PCC Rules are provisioned by the PORT to the PCEF using Diameter CCA. Furthermore, the PCRF may provide authorized QoS.
4. The PCEF installs the received PCC rules and the Subscription Location Information. The PCEF monitors the user location changes that correspond to the provisioned information. It also enforces the authorized QoS and enables or disables service flow according to the flow status of the corresponding PCC Rules.

By making reference to FIG. 8, the following steps are executed corresponding to the phases 1-4 above described.
1. Step 810: Diameter OCR (Establishment of IP CAN session).
2. Step 820: The PORT identifies the location in which the user is and determines the level of granularity in location updates according to the operator defined policies for this user. Then creates the User Session and generates the Location subscription Information, and the FCC rules applicable to the user session to be downloaded to the POET.
3. Step 830: Diameter CCA (PCC rule installation).
4. Step 840: Installation of PCC Rules. Policy enforcement and monitor the user location changes according to the information received from the PCRF.

The step 820 or phase 2 represent examples comprising (amongst possibly other steps) the configuring step of the method depicted in FIG. 1.

Figure 9:
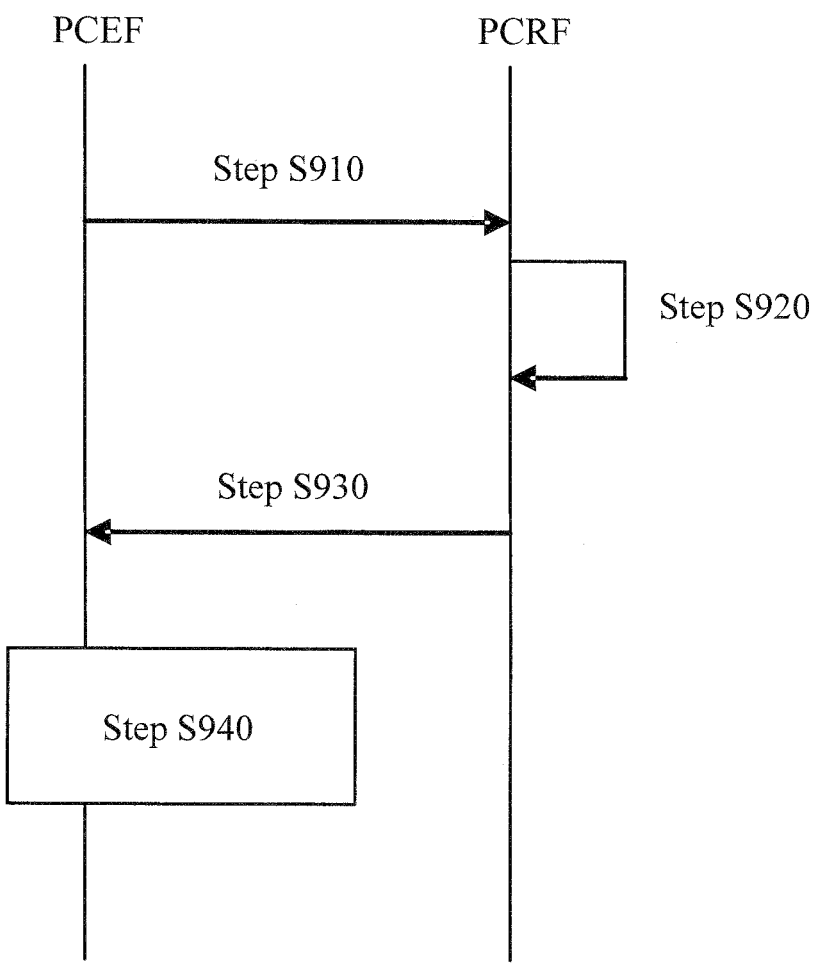
FIG. 9 is a schematic flow chart showing modification of an IP-CAN session according to a further embodiment of the present invention.

Reference will now be made to FIG. 9 representing location based policy handling at IP-CAN session modification according to another embodiment of the present invention applied to the illustrative communication system depicted in FIG. 5.

The following use case applies to a modification of an already established IP-CAN session. The PCEF informs the PCRF when the user changes the location according to the Subscription Location information provisioned by the PCRF. If the PCRF has indicated a set of location areas, the PCEF sends a CCR update when the user enters/leaves any of these location areas. If the PCRF has indicated a set of cell ids, the PCEF sends a CCR update when the user enters/leaves any of these cells. According to the present embodiment, the following phases are executed:
1. The PCEF informs the PCRF of the new location of the user.
2. The PCRF stores the information received in the CCR and recalculates according to the user location information and the operator defined policies what level of granularity is needed for the user location updates, such as location area and likely specific location area identities, cell id and likely specific cell ids; this information is the Location Information Subscription Granularity. The PCRF also generates the PCC rules to be enforced in the PCEF which apply to the user.
3. The Location information Subscription Granularity and the PCC Rules are provisioned by the PCRF to the PCEF using Diameter CCA. Furthermore, the PCRF may provide authorized QoS.
4. The PCEF enforces the received PCC rules.

By making reference to FIG. 9, the following steps are executed corresponding to the phases 1-4 above described.
1. Step 910: Diameter OCR (Modification of user location that fulfils the Location Information Subscription Granularity).
2. Step 920: The PCRF identifies that the user location has changed and recalculates the level of granularity in location updates according to the operator defined policies for this user. Then, it generates the Location Information Subscription Granularity, and the PCC rules applicable to the user session to be downloaded to the POSE.
3. Step 930: Diameter CCA.
4. Step 940: Installation, Modification or Removal of PCC Rules, Policy Enforcement.

As seen, the above phases or steps described with reference to FIG. 9 represent further examples and embodiments corresponding to the steps of the method depicted in FIG. 1.

In the present embodiments, as it can be seen from the above description, possible impact in the implementation of the standard PCEF element can be summarized in the following points:

- Receive the Location Information Subscription Granularity.
- Monitor the user location updates according to the input information received from the PCRF (Location Information Subscription Granularity).
- The PCEF keeps within the IP-CAN session information regarding the granularity that has to apply for the user location updates and informs the PCRF only when these criteria are fulfilled.
- Indicate to SGSN the Location Information Subscription Granularity, which may be cell id(s) or service area id(s).

The possible impacts on the standard PCRF element can be summarized in the following:

- Determine what level of granularity in the location information is needed for each user according to the current location information of the user and the operator defined policies that use as input the location information and the user profile that contains information about location home area, work area, etc.
- Maintain a relation between IP-CAN session and the Location Information Subscription Granularity.
- Send the Location Information Subscription Granularity to the PCEF.

The possible impacts on the Gx reference point may comprise adding new AVPs to indicate the location information subscription granularity towards the PCEF element.

The present invention as explained above with reference to different embodiments achieves several advantages that can be summarized in the following:

- Provides a solution for applying different controls, as QoS, Access, Charging, Content Insertion, Redirection, Terminal access steering, etc. considering location information.
- Solves the problem of the large amount of signaling that would be produced in the standard implementation in which the reception of location information is not limited to only the specific areas that require to apply certain actions.
- Improves the reception of location information providing a mechanism to specify the level of granularity (location area, service area, cell id).
- Permits to receive updated location information to be used for policy evaluation with a level of granularity (location area, cell id) that is needed according to the use cases demanded by the operators, while avoiding a large amount of signaling.

In the above description, several abbreviations, terms or concepts have been used. In the following, some of the abbreviations are listed and some of the terms are briefly explained. This should be understood as giving guidance in understanding some aspects of the invention but should not be interpreted as limiting the invention, which is instead defined by the appended claims. In fact, the skilled person would realize that the definitions given below are a mere indication of some of the functions that each of the defined terms should be able to carry out and should not be understood as limiting the features referred to.

LIST OF SOME ABBREVIATIONS

AF Application Function
GGSN Gateway GPRS Support Node
GW Gateway
IP-CAN IP Connectivity Access Network
PCC Policy and Charging Control
PCRF Policy and Charging Rules Function
SDF Service Data Flow

| Terms | Brief illustrative non limiting explanation |
|---|---|
| Application Function | A logical element that offers applications the ability to control IP bearer resources. The Application Function is capable of communicating through PCRF with the GGSN to transfer authorization information. |
| Bearer | IP packet transport capable of carrying many IP flows. In the context of GPRS it is synonymous with a PDP context. |
| Binding | A mechanism to associate IP flows with PDP contexts. |
| Charging Rule | A set of information including the service data flow filters (IP 5 tuple), the gating status (pass/drop packets matching the rule) and the rating group, for a single service data flow. |
| Charging rule provisioning | An action taken by PCRF to inform GGSN about the charging rules to be applied. It can be in response to a request from the GGSN or unsolicited in response to information provided by the AF. |
| Dedicated PDP Context | A PDP context with associated TFT filters, this may be a secondary or a primary PDP context (updated after its activation). There can be several such PDP contexts for a UE IP address. |
| Downlink | Refers to the direction of traffic from the network to the UE. |
| Dynamic Charging Rule | A charging rule where some or all the data within the charging rule (e.g. service data flow filter information) is assigned via real-time analysis using for example dynamic application derived criteria. An example of a dynamic charging rule is a rule determined by the PCRF by means of real-time SDP derived information analysis. |
| Flow Description | The same concept as Service Data Flow Filter. |
| Gating | A mechanism to enable or disable flows at the GGSN. It is used in order to minimize signaling, charging rules are installed with status closed until the user access the service that the status is changed to open. It can be used when a media is temporarily paused. |
| General Purpose PDP Context | A PDP context without associated TFT filters where all the traffic is allowed (including internet traffic). This may be a primary or a secondary PDP context. However, only one PDP context without associated TFT filters can exist for a UE IP address. |
| IP Flow | A unidirectional flow of IP packets with the same source IP address and port number, the same destination IP address and port number and the same transport protocol. Port numbers are only applicable if used by the transport protocol |
| IP 5 Tuple | Identifies an IP flow and includes source IP address and port, destination IP address and port, and protocol. |
| Media Component | A part of an AF session description conveying information about media (e.g. media type, format, IP address, port(s), transport protocol, bandwidth, direction). The media described by a media component can be either bi- or unidirectional. Media using RTP for transport may also |

| Terms | Brief illustrative non limiting explanation |
|---|---|
| | have associated RTCP. If so, the media component also conveys information about the associated RTCP (port and possibly bandwidth). An AF session description can consist of more than one media component. Media Component is composed of Media Subcomponents |
| Media Subcomponent | A part of a Media Component describing a bi- or unidirectional IP flow. |
| Policy Decision | A set of policy information GGSN receives from PCRF. PCRF constructs policy decision on the basis of Application Function events (i.e. in the scope of this document IMS session events) and events possibly received from GGSN. |
| Preconfigured Charging Rule | A charging rule created and configured in PCRF by the operator. |
| Pre-established PDP Context | A PDP context that a UE has chosen to activate for the purpose of transporting IMS media prior to establishing an IMS session. |
| Primary PDP Context | The first PDP context activated by a UE. At the primary PDP context activation an IP address (the PDP address) is assigned to a UE. When activated a primary PDP context is general purpose (i.e. with no associated TFT filters). |
| Pull model | A communication model where a policy decision is requested by the GGSN. |
| Push model | A communication model where a policy decision is sent unsolicited by the authorizing entity (i.e. PCRF) to the GGSN. |
| QoS Authorization | Refers to the action taken by PCRF to determine that the QoS requested by the UE is allowed. The determination is based on either the service information provided by the AF or by consulting pre-configured rules. |
| SDP offer/answer | A method used in IMS (SIP) to negotiate a multimedia (IMS) session between end points and arrive at a common view of the media parameters. |
| Secondary PDP Context | A new activated PDP context reusing the PDP address and other PDP context information from an already active PDP context, but with a different QoS profile. A secondary PDP context may be dedicated (i.e. with associated TFT filters) or general purpose (i.e. with no associated TFT filters). |
| Service Data Flow | An aggregate set of IP flows. In the case of GPRS/WCDMA, it shall be possible that a service data flow is more granular than a PDP context. |
| Service Data Flow Filter | A set of filter parameters used to identify one or more of the IP flows constituting a service data flow. At least the following means for the IP flow identification shall be supported: source and destination IP address+port, protocol. This concept is used in the Gx interface. |
| Service Session | A session established between the UE and the AF. |
| Traffic Flow Template | Each PDP address may be described by one or more PDP contexts in the UE or the network. The PDP Context Activation procedure is used to activate the first PDP context for a given PDP address and APN, whereas all additional contexts associated to the same PDP address and APN are activated with the secondary PDP context activation procedure. When more than one PDP context is associated with a PDP address, there must be a Traffic Flow Template (TFT) for each or all but one context. The TFT is sent by the UE transparently via the SGSN to the GGSN to enable packet classification and policing for downlink data transfer. The TFT contains packet filters. A packet filter contains at least on the following pieces of information: Destination port or port range Source IP address (IPv4 or IPv6) Source port or port range Protocol identifier The TFT packet filters are used by PCRF to identify the charging rules to be returned to GGSN. |
| Uplink | Refers to the direction of traffic from the UE to the network. |
| User/Subscriber | In this document both terms are applied indistinctly referring to the entity requesting a service. |

Where the terms like controller, transmitter, network entity are used herewith, no restriction is made regarding how distributed these elements may be and regarding how gathered elements may be. That is, the constituent parts of a unit or element or entity may be distributed in different software or hardware components or devices for bringing about the intended function. A plurality of distinct elements may also be gathered for providing the intended functionalities.

Any one of the above-referred units of a network entity, or an element, or a network device, or a network node, etc. . . . may be implemented in hardware, software, field-programmable gate array (FPGA), application-specific integrated circuit (ASICs), firmware or the like.

In further embodiments of the invention, any one of the above-mentioned and/or claimed parts like controller or receiver (this list being not exhaustive) may be replaced by corresponding controlling means or receiving means.

In further embodiments of the invention, any one of the above-described steps may be implemented using computer-readable instructions, for instance in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

Further embodiments of the present invention can be also described in a schematic way as in the following.

1. A policy and charging control method carried out in a communication network, the communication network comprising a first network entity (100), PCRF, including a policy and charging rules function and a second network entity (200), PCEF, including a policy and charging enforcement function for enforcing policy and charging rules in at least two groups of cells, each group of cells including at least one cell, the method comprising the steps of:

configuring (S110), on the second network entity, for a first one group of the at least two groups of cells, an event subscription dependent on a location of the user equipment, the event subscription being specific to the first group of cells;

at the second network entity, detecting (S120) an event associated with the configured event subscription and sending a notification of the detected event to the first network entity;

at the first network entity, after receipt of the notification, determining (S130) whether to perform one among installing, modifying and removing a policy and charging control rule in dependence of the detected event.

2. The policy and charging control method according to embodiment 1, wherein the event subscription further depends on at least one among a user profile associated to a user of the user equipment and policy criteria associated to the user.

3. The policy and charging control method according to embodiment 1 or 2, wherein the event subscription is configured on the basis of configuration information received at the second network entity from at least one among the first network entity and a further network entity.

4. The policy and charging control method according to embodiment 3, wherein the configuration information comprises predetermined values corresponding to predetermined event subscriptions.

5. The policy and charging control method according to any of the preceding embodiments, wherein the event subscription is received at the second network entity from at least one among the first network entity and a further network entity.

6. The policy and charging control method according to any of the preceding embodiments, wherein the event subscription is pre installed in the second network entity.

7. The method according to any of the preceding embodiments, wherein the event subscription comprises a subscription to at least an event, the at least an event dependent on a location of the user equipment.

8. The method according to embodiment 7, wherein the at least an event further depends on at least one among a user profile associated to a user of the user equipment and a policy criteria associated to the user.

9. The method according to any of the preceding embodiments, wherein the step of configuring on the second entity comprises installing the event subscription on the second entity.

10. The method according to any of the preceding embodiments, wherein the detected event comprises at least one among the user equipment entering one of the group of cells and leaving one of the group of cells.

11. The method according to any of the preceding embodiments, further comprising, when it is determined at least one among installing, modifying and removing a policy and charging control rule in dependence of the detected event, performing a corresponding step comprising, respectively, installing a new policy and charging control rule, modifying an existing policy and charging control rule, and removing an existing policy and charging control rule.

12. The method according to any of the preceding embodiments, further comprising a step of generating a set of event subscriptions comprising at least one event subscription, each event subscription specific to a group of cells, and wherein the step of configuring the event subscription comprises selecting the subscription from the set of subscriptions.

13. The method according to any of the preceding embodiments, wherein the first group of cells is the cell wherein the user equipment is currently located.

14. The method according to any of the preceding embodiments, comprising selecting the at least one cell comprised in one among said at least two groups of cells with reference to one among a user profile associated to a user of the user equipment and policy criteria associated to the user equipment.

15. The method according to any of the preceding embodiments, further comprising a step of establishing or modifying a communication session between the user equipment and the second entity, a step of requesting policy and charging rules for said communication session from the first entity, and wherein the step of configuring the event subscription is performed in response to the step of requesting the policy and charging rules.

16. A network entity (100) configured to perform a policy and charging rules function in a communications network, the network entity comprising:

a controller (110) for determining event subscription information on the basis of a location of a user equipment, the event subscription information being specific to a first group of cells, the first group of cells comprised in at least two groups of cells, each group of cells including at least one cell;

a transmitter (120) for sending the event subscription information to a second network entity;

a receiver (130) for receiving from the second network entity a notification corresponding to an event detected according to the event subscription information; and wherein the controller (110) is further adapted to further determine, upon receipt of the notification, whether to instruct the second network entity to perform one among installing, modifying or removing a policy and charging control rule in dependence of the detected event.

17. The network entity according to embodiment 16, wherein the controller is further adapted to further determine the event subscription information on the basis of at least one among a user profile associated to a user of the user equipment and policy criteria associated to the user.

18. The network entity according to embodiment 16 or 17, wherein the event subscription information comprises a subscription to at least an event, the at least an event dependent on a location of the user equipment; and wherein the transmitter is further adapted to send the event subscription information to the second network entity and to instruct the second network entity to configure the event subscription.

19. The network entity according to any of embodiments 16 to 18, wherein the event subscription information comprises predetermined values corresponding to a subscription to at least an event, the at least an event dependent on a location of the user equipment; and wherein the transmitter is adapted to send the predetermined values comprised in the event subscription information to the second network entity.

20. The network entity according to embodiment 19, wherein the controller is further adapted to instruct the second network entity to install the subscription corresponding to the sent predetermined values.

21. The network entity according to any of embodiments 16 to 20, wherein the controller is further adapted to maintain a relationship among the event subscription information and a communication session between a user equipment and the second network entity.

22. The network entity according to any of embodiments 16 to 21, wherein the controller is further adapted, when it is determined to install, modify or remove a policy and charging control rule in dependence of the detected event, to instruct the second network entity to perform a corresponding operation of, respectively, installing a new policy and charging control rule, modifying an existing policy and charging control rule or removing an existing policy and charging control rule.

23. A network entity (200) configured to perform a policy and charging enforcement function for enforcing policy and charging rules in at least two groups of cells in a communications network, each group of cells including at least one cell, the network entity comprising:
   a controller (210) for configuring, for a first one of the at least two groups of cells, at least an event subscription dependent on a location of a user equipment, the event subscription being specific to the first group of cells;
   a detector (220) for detecting an event associated with the configured event subscription; and wherein
   a receiver (230) adapted to receive instructions from a first network entity to install, modify or remove policy and charging rules depending on the detected event.

24. The network entity according to embodiment 23, wherein the controller is further adapted to receive event subscription information from one among a first network entity and a further network entity.

25. The network entity according to embodiment 24, wherein event subscription information comprises one among a subscription to at least an event dependent on a location of the user equipment and predetermined values corresponding to predetermined event subscriptions.

26. The network entity according to any of embodiments 23 to 25, wherein the controller is further adapted to maintain a relationship among the event subscription information and a communication session between a user equipment and the second network entity.

27. The network entity according to any of embodiments 23 to 26, wherein the controller is adapted to exchange information corresponding to the event subscription information with a further network entity configured to communicate with the user equipment.

28. The network entity according to any of embodiments 23 to 27, further comprising a transmitter for sending a notification of the detected event to the first entity.

29. A communication system for performing policy and charging in accordance with a location of a user equipment in a communications network, the communication system comprising a first entity according to any of embodiments 16 to 22 and a second entity according to any of embodiments 23 to 28.

30. A communication system for performing policy and charging in a communications network, the communication system including:
   a first network entity (100) comprising:
   a first controller (110) for determining event subscription information on the basis of a location of a user equipment, the event subscription information being specific to a first group of cells, the first group of cells comprised in at least two groups of cells, each group of cells including at least one cell;
   and a second network entity (200) comprising:
   a second controller (210) for configuring, for a first one of the at least two groups of cells and on the basis of said subscription information, an event subscription dependent on a location of a user equipment, the event subscription being specific to the first group of cells;
   a detector (220) for detecting an event associated with the configured event subscription and for sending to the first network entity (100) a notification corresponding to an event detected according to the event subscription information; and wherein
   the first controller (100) is further adapted to further determine, upon receipt of the notification, whether to instruct the second network entity (200) to perform one among installing, modifying or removing a policy and charging control rule in dependence of the detected event.

31. A computer program for performing a policy and charging rules function in accordance with a location of a user equipment in a communications network, the computer program including instructions configured, when executed on a programmable device, to cause the programmable device to carry out the steps of:
   determining event subscription information on the basis of a location of a user equipment, the event subscription information being specific to a first group of cells, the first group of cells comprised in at least two groups of cells, each group of cells including at least one cell;
   sending the event subscription information to a second network entity;
   receiving from the second network entity a notification corresponding to an event detected according to the event subscription information; and wherein
   further determining, upon receipt of the notification, whether to instruct the second network entity to install a policy and charging control rule in dependence of the detected event.

32. A computer program for performing, in accordance with the location of a user equipment in a communications network, a policy and charging enforcement function for enforcing policy and charging rules in at least two groups of cells, each group of cells including at least one cell, the computer program including instructions configured, when executed on a programmable device, to cause the programmable device to carry out the steps of:
   configuring, for a first one of the at least two groups of cells, at least an event subscription dependent on a location of a user equipment, the event subscription being specific to the first group of cells;
   detecting an event associated with the configured event subscription; and wherein
   receiving instructions from a first network entity to install policy and charging rules depending on the detected event.

33. A computer program for performing a policy and charging rules function in accordance with a location of a user equipment in a communications network, the computer program comprising instructions configured, when executed on a distributed programmable system, to cause the programmable system to carry out the method steps according to any of embodiments 1 to 15.

The invention claimed is:

1. A policy and charging control method carried out in a communication network, the communication network comprising a first network entity, PCRF, including a policy and charging rules function and a second network entity, PCEF, including a policy and charging enforcement function to enforce policy and charging rules in at least two groups of cells, each group of cells including at least one cell, the method comprising:
   configuring, on the second network entity, for a first group of the at least two groups of cells, an event subscription dependent on a location of the user equipment, the event subscription being specific to the first group of cells;
   at the second network entity, detecting an event associated with the configured event subscription and sending a notification of the detected event to the first network entity;

at the first network entity, after receipt of the notification, determining whether to perform one among installing, modifying and removing a policy and charging control rule in dependence of the detected event,
wherein the event subscription further depends on at least a user profile associated to a user of the user equipment,
wherein the user profile indicates areas defined for the user of the user equipment, and
wherein at least one area in the user profile corresponds to the first group of cells.

2. The policy and charging control method according to claim 1, wherein the configuring is performed beforehand and later associated to the user when the user enters the first group of cells.

3. The policy and charging control method according to claim 1, wherein the event subscription is configured based on configuration information received at the second network entity from at least one among the first network entity and a further network entity.

4. The method according to claim 1, wherein the event subscription comprises a subscription to at least an event, the event being dependent on the location of the user equipment.

5. The method according to claim 1, wherein the detected event comprises at least one among the user equipment entering one of the group of cells and leaving one of the group of cells.

6. The method according to claim 1, further comprising, when it is determined at least one among installing, modifying and removing a policy and charging control rule in dependence of the detected event, performing a corresponding step comprising, respectively,
installing a new policy and charging control rule,
modifying an existing policy and charging control rule, and
removing an existing policy and charging control rule.

7. The method according to claim 1, further comprising:
establishing or modifying a communication session between the user equipment and the second entity; and
requesting policy and charging rules for the communication session from the first network entity,
wherein the step of configuring the event subscription is performed in response to the step of requesting the policy and charging rules.

8. A network entity configured to perform a policy and charging rules function in a communications network, the network entity comprising:
a controller adapted to determine event subscription information based on a location of a user equipment, the event subscription information being specific to a first group of at least two groups of cells, each group of cells including at least one cell;
a transmitter adapted to send the event subscription information to a second network entity; and
a receiver adapted to receive from the second network entity a notification corresponding to an event detected according to the event subscription information,
wherein the controller is further adapted to further determine, upon receipt of the notification, whether to instruct the second network entity to perform one among installing, modifying or removing a policy and charging control rule in dependence of the detected event,
wherein the controller is further adapted to further determine the event subscription information based on at least a user profile associated to a user of the user equipment,
wherein the user profile indicates areas defined for the user of the user equipment, and
wherein at least one area in the user profile corresponds to the first group of cells.

9. The network entity according to claim 8, further adapted to determine the event subscription information beforehand and to later associate the event subscription information to the user when the user enters the first group of cells.

10. The network entity according to claim 8, wherein the controller is further adapted to maintain a relationship among the event subscription information and a communication session between the user equipment and the second network entity.

11. The network entity according to claim 8, wherein the controller is further adapted, when it is determined to install, modify or remove a policy and charging control rule in dependence of the detected event, to instruct the second network entity to perform a corresponding operation of, respectively,
installing a new policy and charging control rule,
modifying an existing policy and charging control rule, or
removing an existing policy and charging control rule.

12. A network entity configured to perform a policy and charging enforcement function to enforce policy and charging rules in at least two groups of cells in a communications network, each group of cells including at least one cell, the network entity comprising:
a controller adapted to configure, for a first group of the at least two groups of cells, at least an event subscription dependent on a location of a user equipment, the event subscription being specific to the first group of cells;
a detector adapted to detect an event associated with the configured event subscription; and
a receiver adapted to receive instructions from a first network entity to install, modify or remove policy and charging rules depending on the detected events,
wherein the event subscription further depends on at least a user profile associated to a user of the user equipment,
wherein the user profile indicates areas defined for the user of the user equipment, and
wherein at least one area in the user profile corresponds to the first group of cells.

13. The network entity according to claim 12, wherein the event subscription is configured beforehand and later associated to the user when the user enters the first group of cells.

14. The network entity according to claim 12, wherein the controller is further adapted to receive event subscription information from one among a first network entity and a further network entity.

15. The network entity according to claim 12, wherein the controller is further adapted to maintain a relationship among the event subscription and a communication session between the user equipment and the second network entity.

16. The network entity according to claim 12, wherein the controller is adapted to exchange information corresponding to the event subscription with a further network entity configured to communicate with the user equipment.

17. The network entity according to claim 12, further comprising a transmitter adapted to send a notification of the detected event to the first entity.

18. A communication system arranged to perform policy and charging in a communications network, the communication system comprising:
a first network entity comprising:
a first controller adapted to determine event subscription information based on a location of a user equipment, the event subscription information being specific to a first group of at least two groups of cells, each group of cells including at least one cell; and
a second network entity comprising:
a second controller adapted to configure, for the first group of cells and based on the event subscription information, an event subscription dependent on the location of the user equipment, the event subscription being specific to the first group of cells; and a detector adapted to detect an event associated with the configured event subscription and adapted to send to the first network entity a notification corresponding to an event detected according to the event subscription, wherein the first controller is further adapted to determine, upon receipt of the notification, whether to instruct the second network entity to perform one among installing, modifying or removing a policy and charging control rule in dependence of the detected event, wherein the event subscription further depends on at least a user profile associated to a user of the user equipment, wherein the user profile indicates areas defined for the user of the user equipment, and wherein at least one area in the user profile corresponds to the first group of cells.

19. The communication system according to claim 18, further adapted to determine the event subscription information beforehand and to later associate the event subscription information to the user when the user enters said first group of cells.

20. A computer program for performing a policy and charging rules function in accordance with a location of a user equipment in a communications network, the computer program comprising instructions configured, when executed on a programmable system, to cause the programmable system to carry out the method steps according to claim 1.

* * * * *